June 25, 1929.  J. W. DROLL  1,718,639

MATTRESS ROLL FORMING AND STITCHING MACHINE

Filed Aug. 17, 1926   19 Sheets-Sheet 1

INVENTOR
JOSEPH W. DROLL
BY Arthur L. Slee
ATTY.

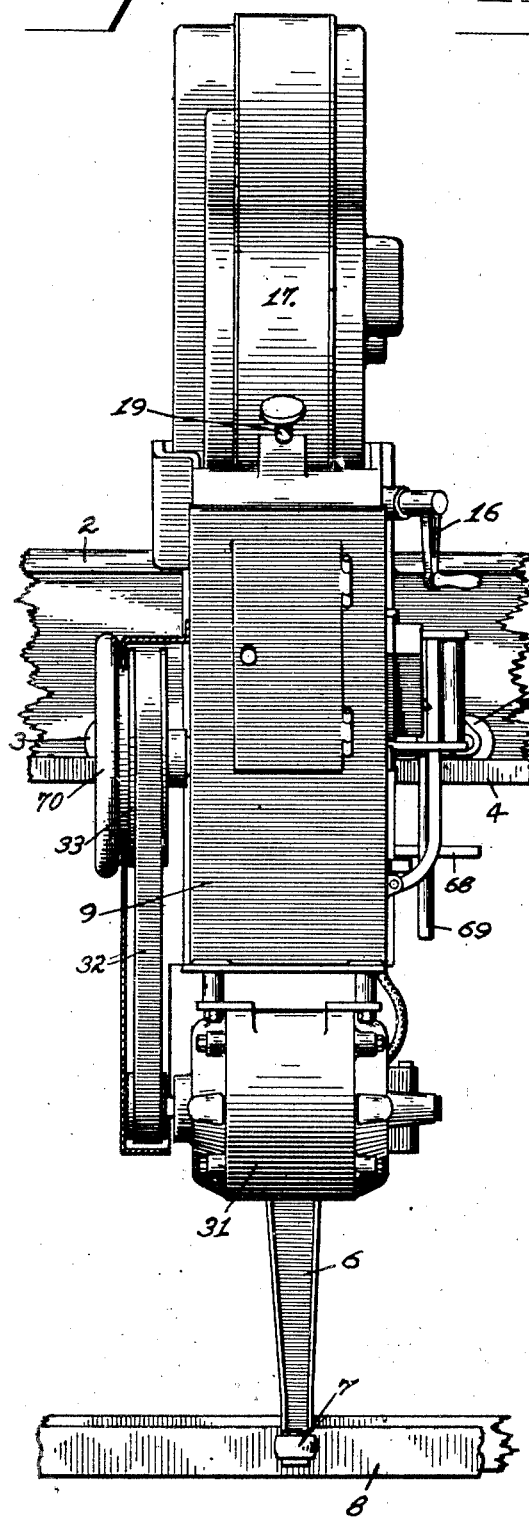
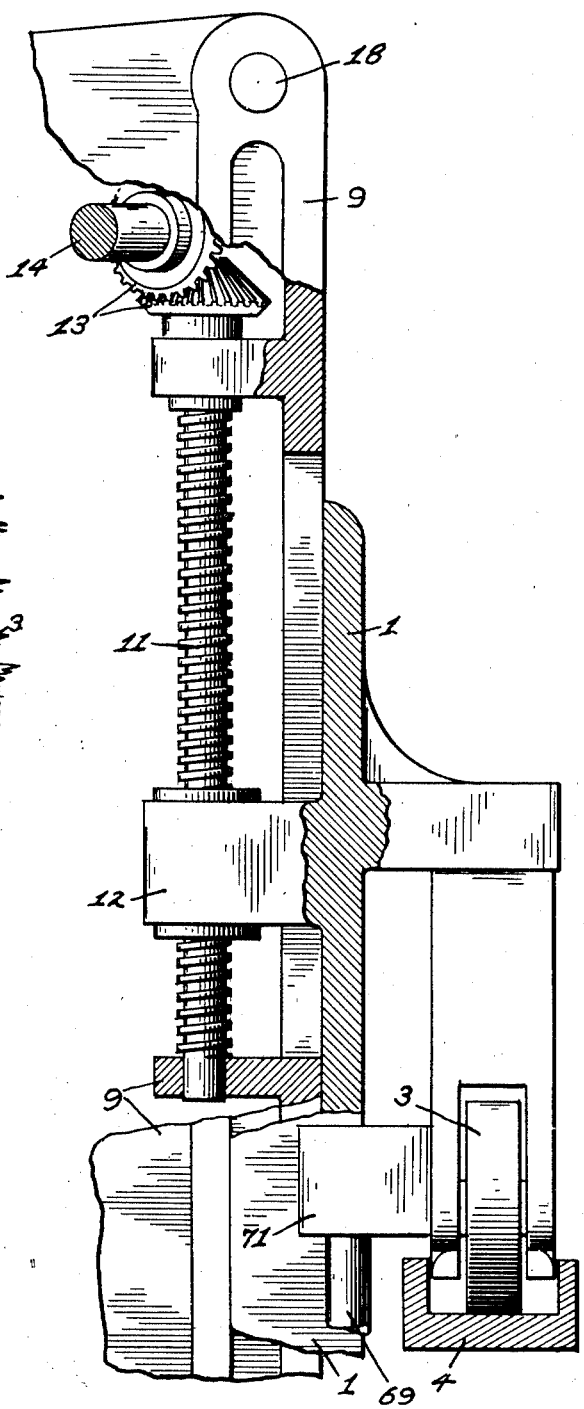

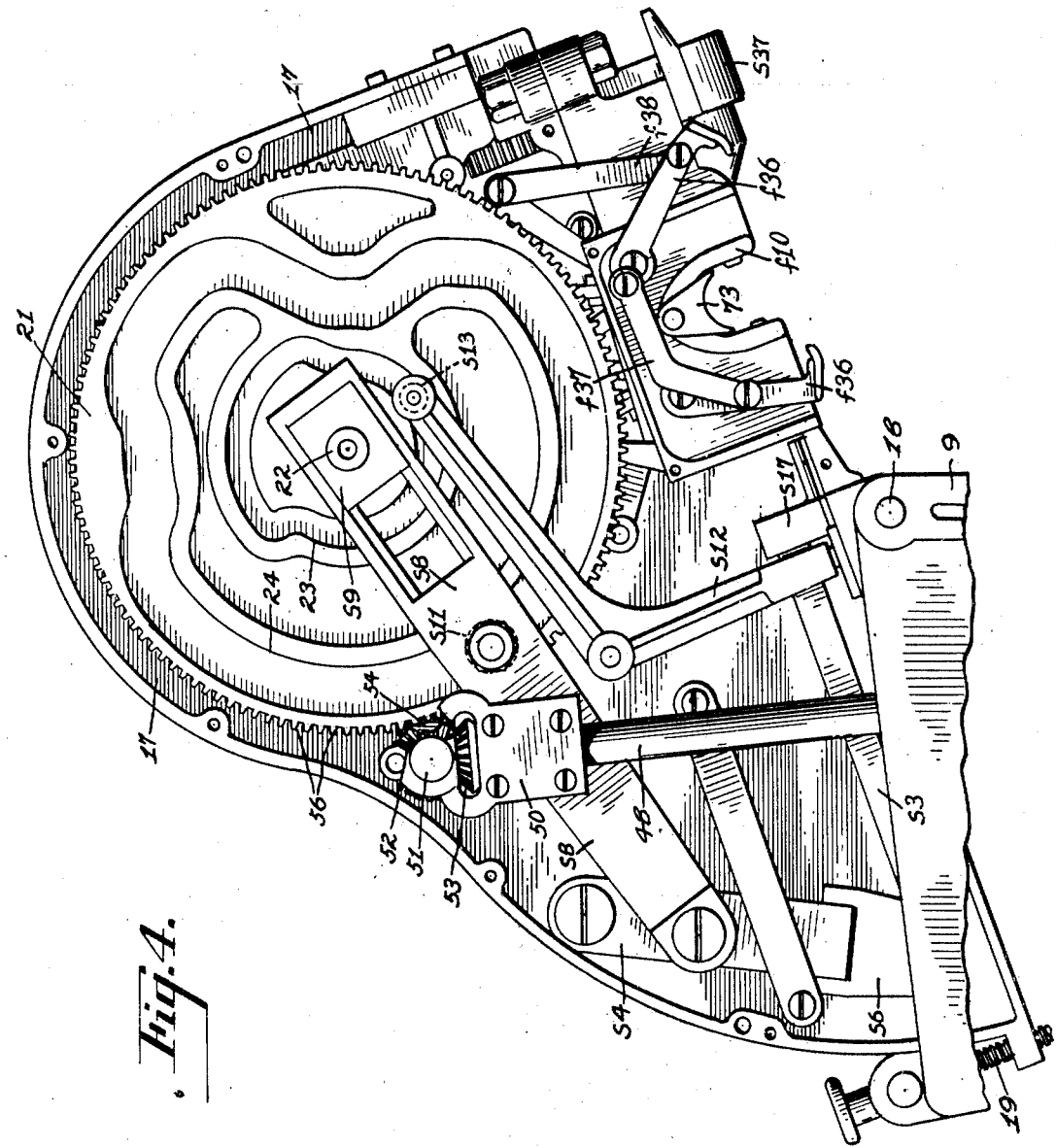

INVENTOR
JOSEPH W. DROLL
BY Arthur L. Slee
ATTY.

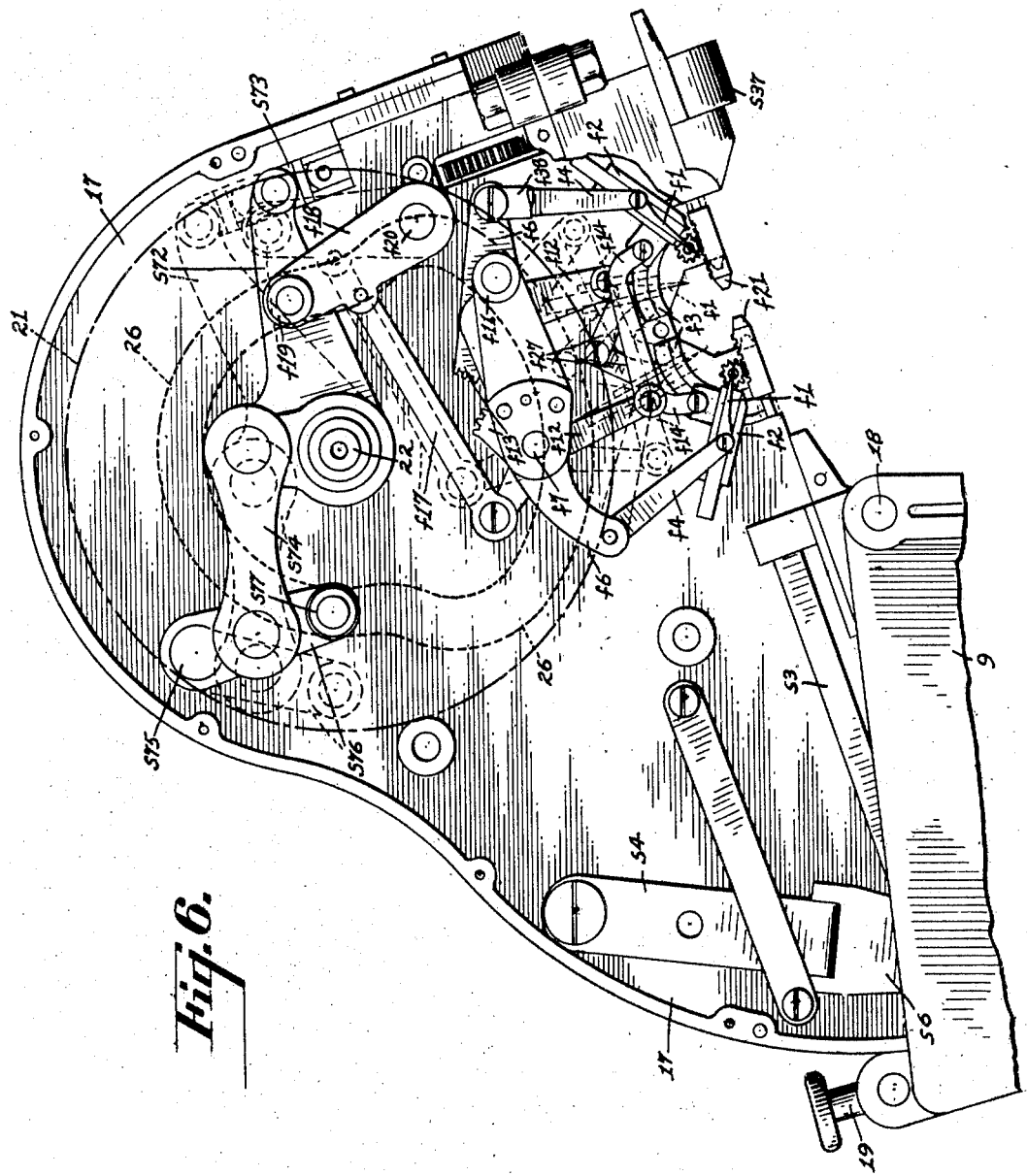

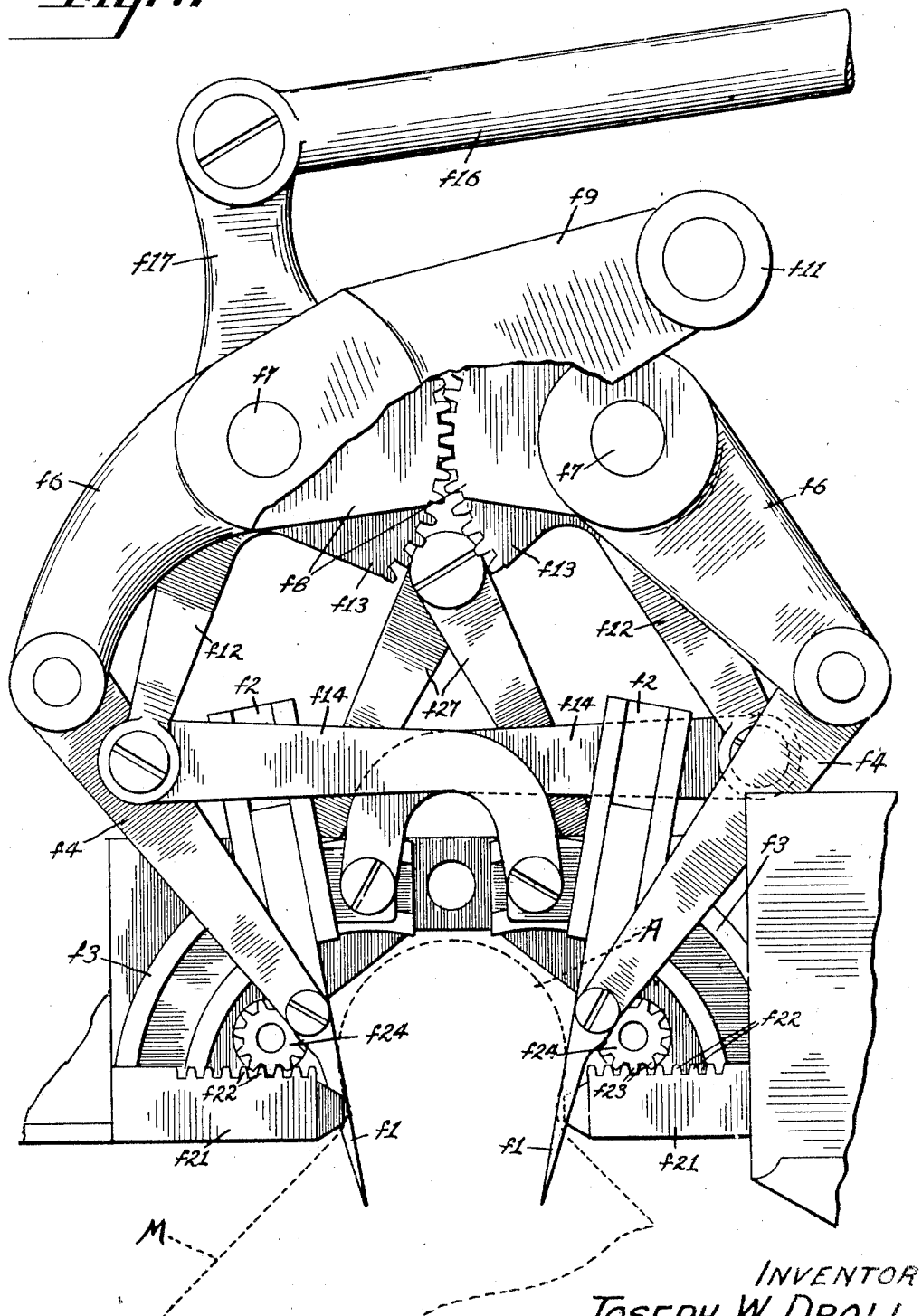

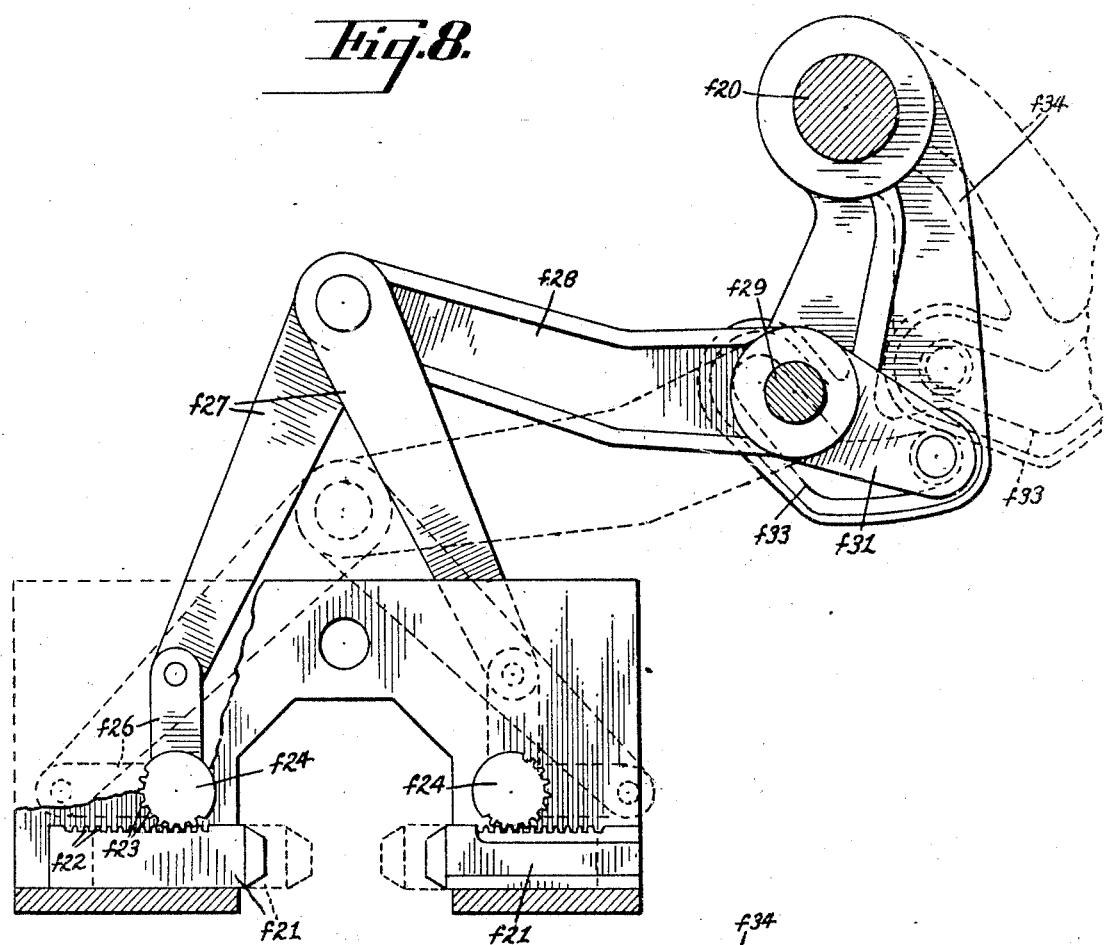
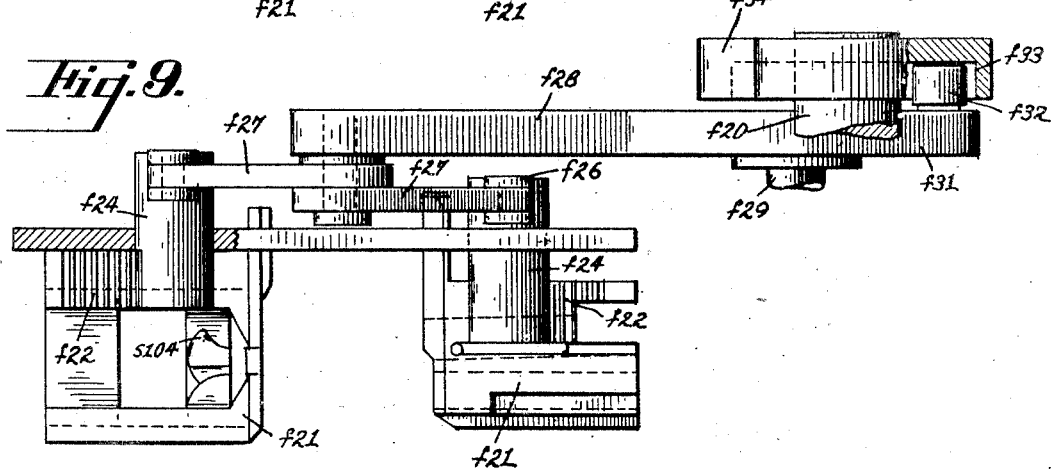

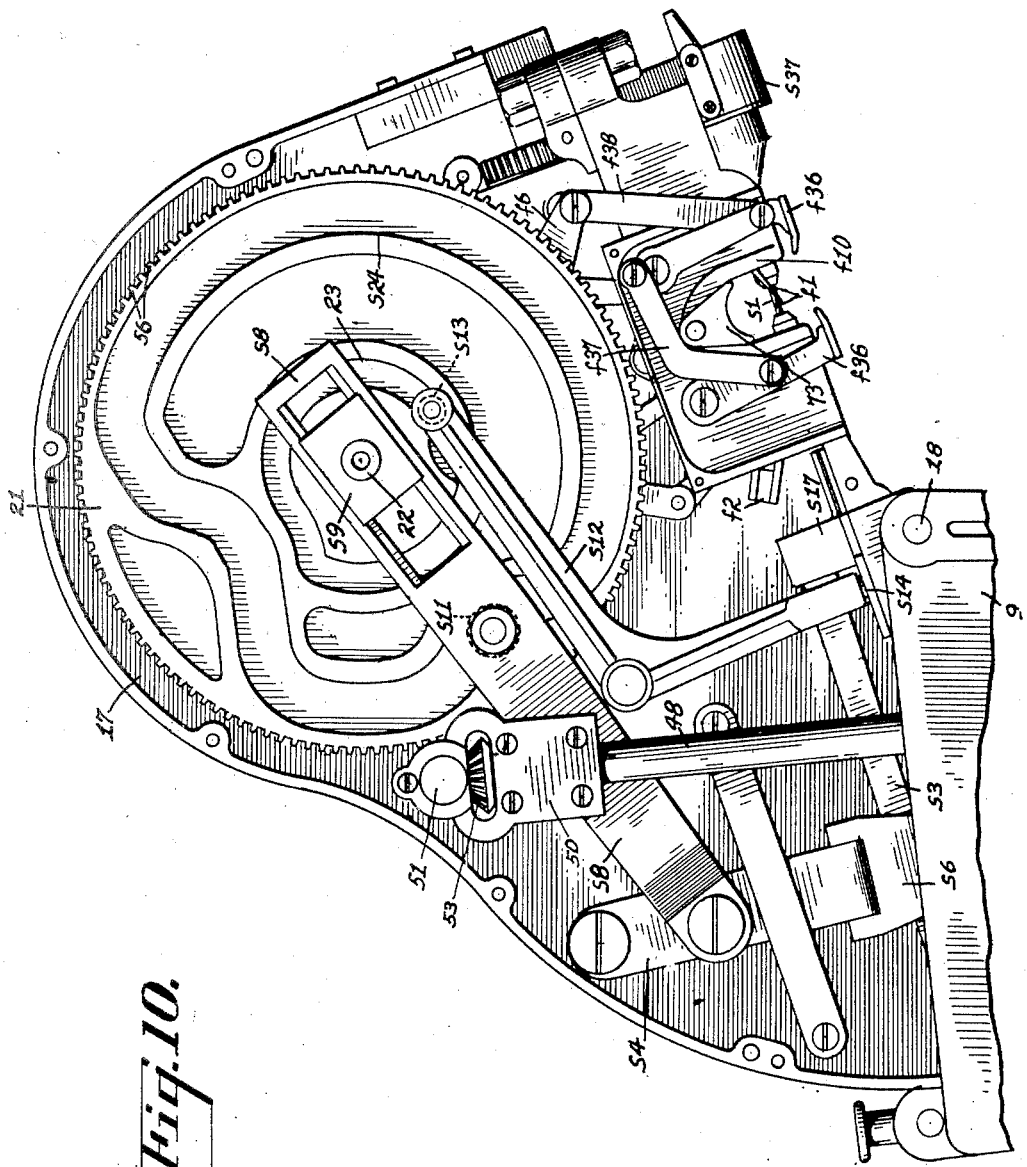

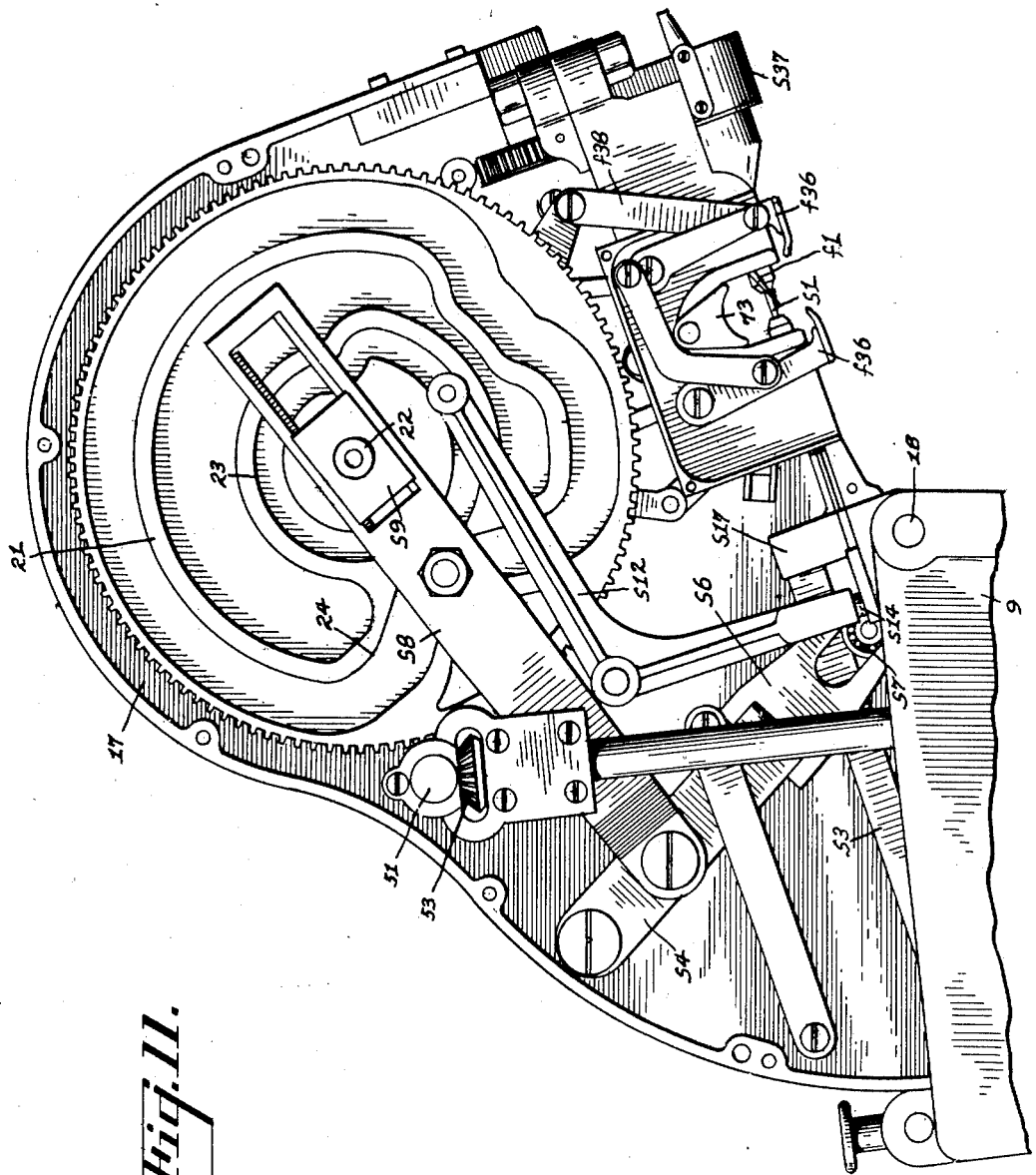

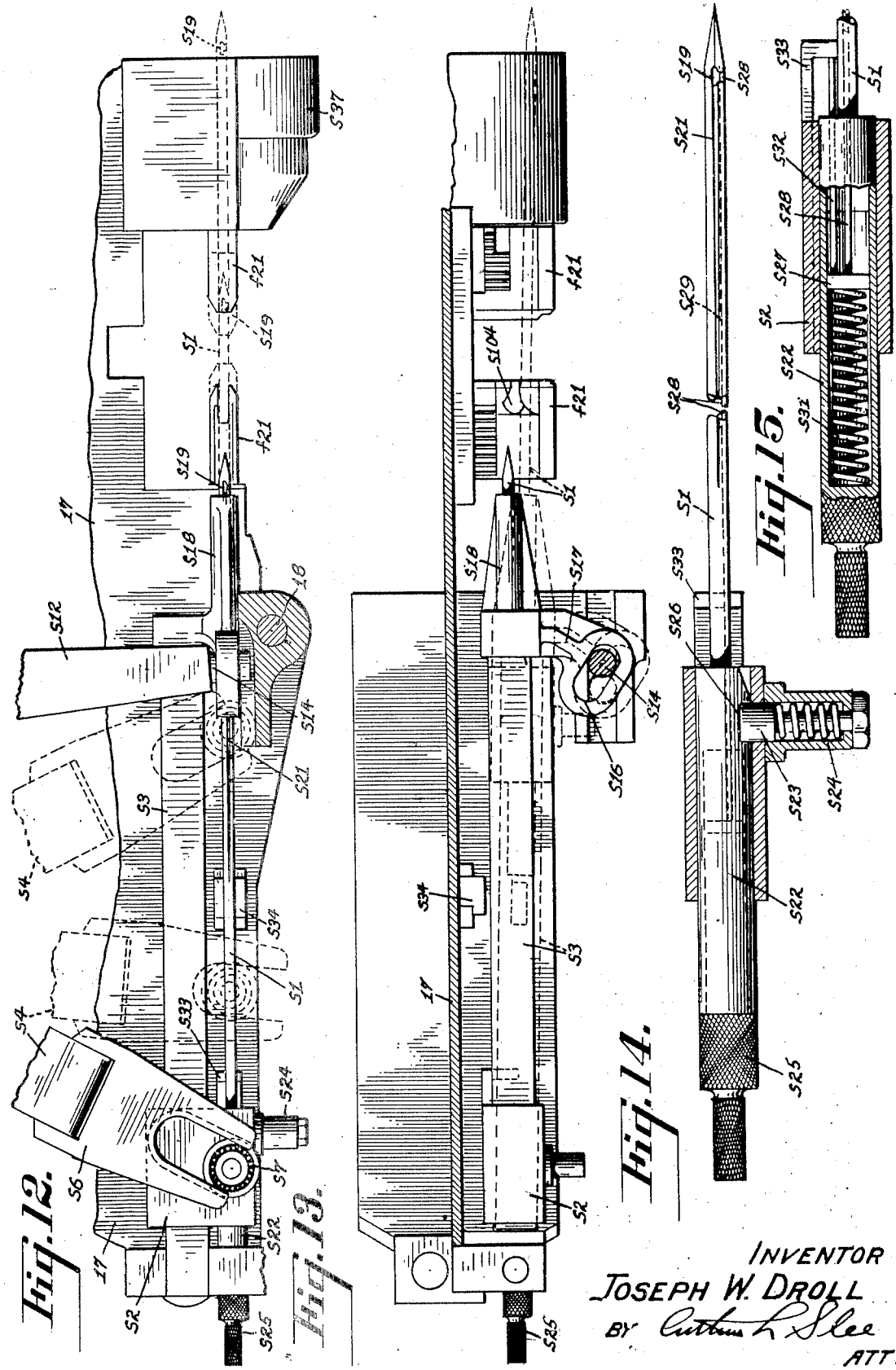

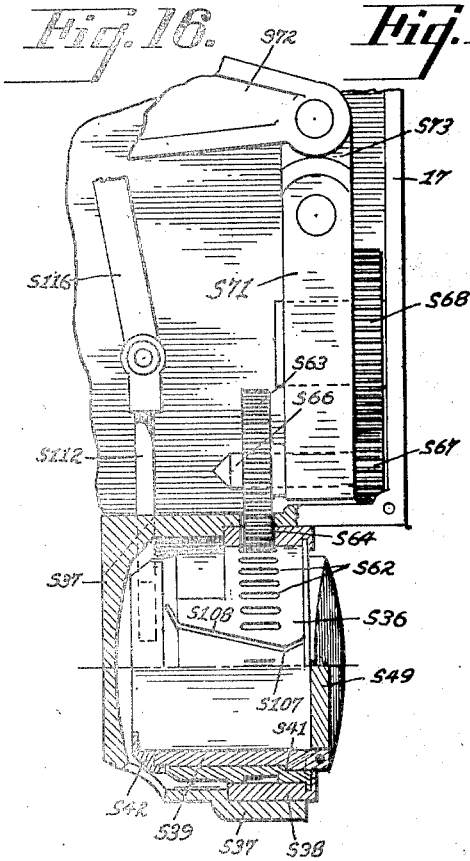
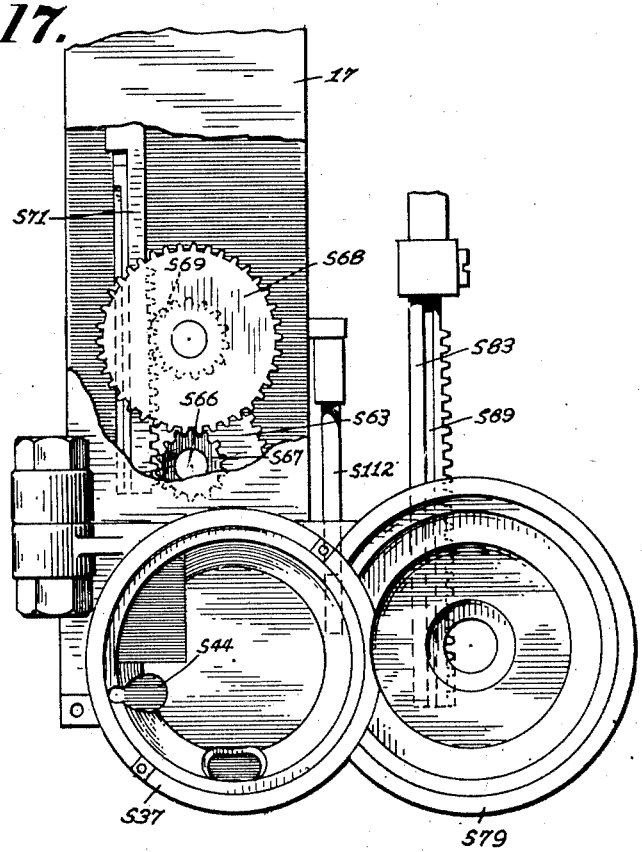
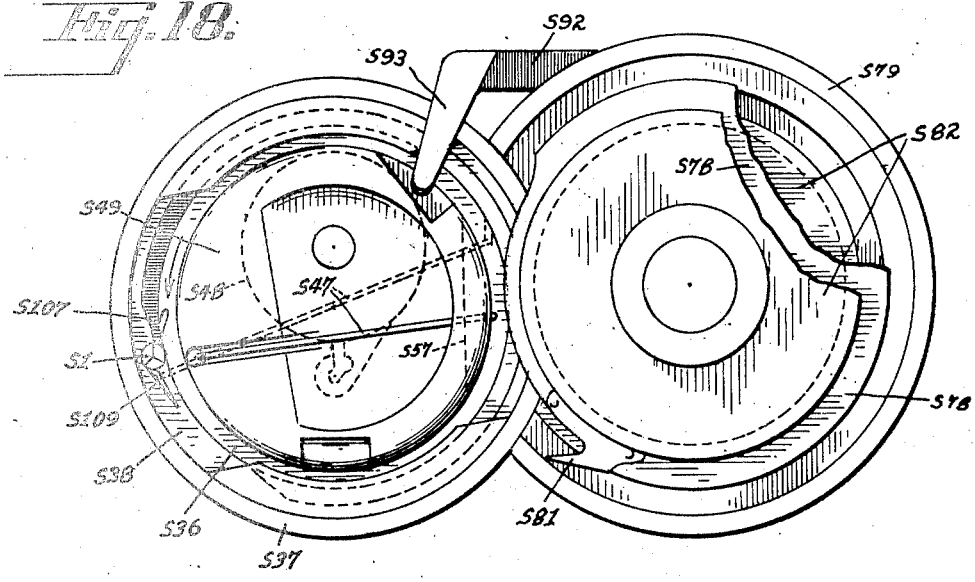

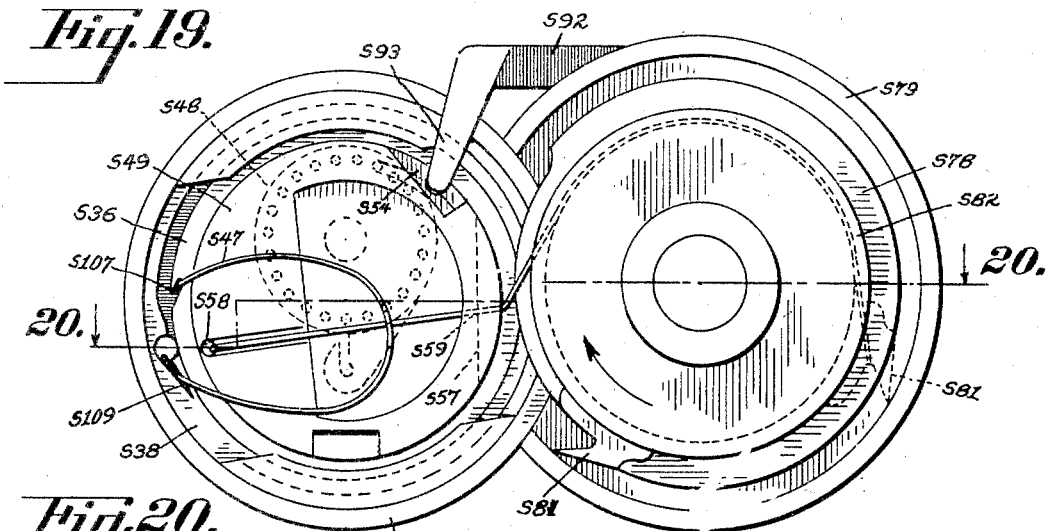
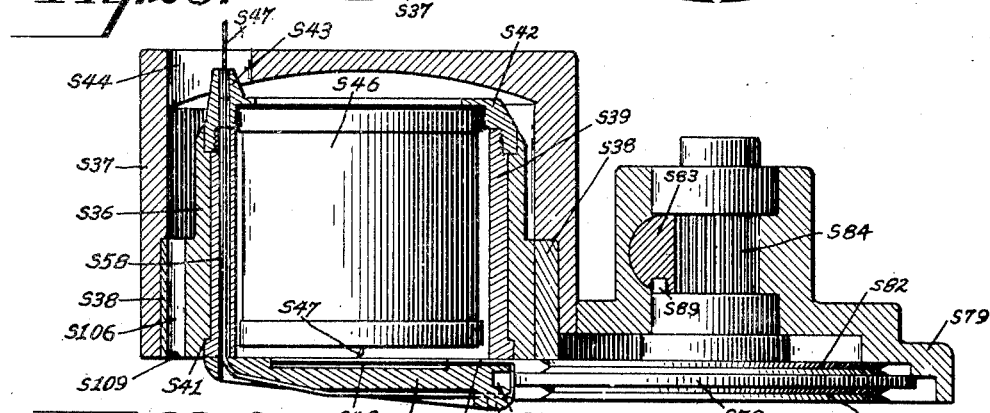
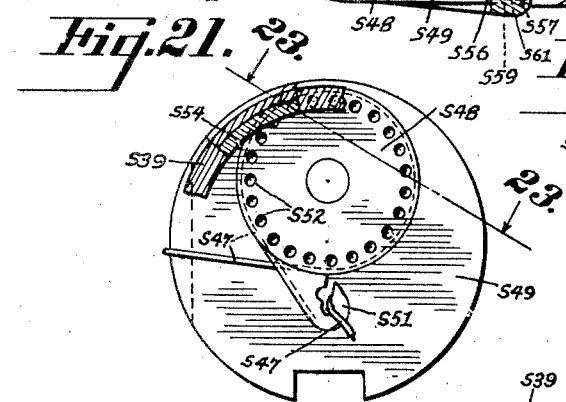
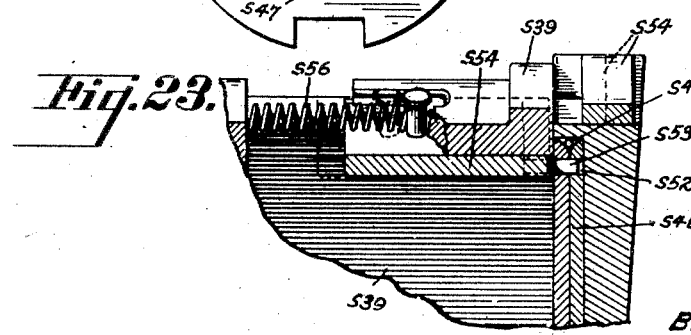

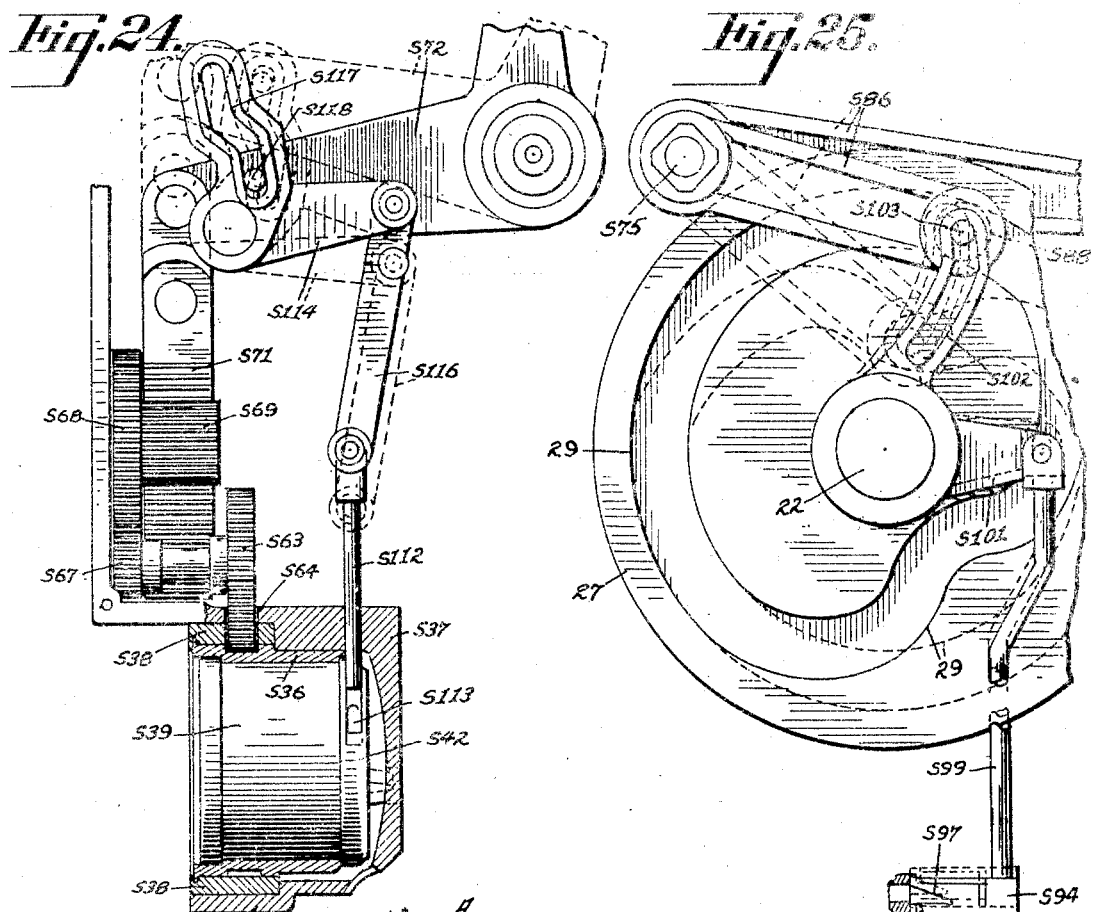

June 25, 1929. J. W. DROLL 1,718,639
MATTRESS ROLL FORMING AND STITCHING MACHINE
Filed Aug. 17, 1926 19 Sheets-Sheet 14

INVENTOR
JOSEPH W. DROLL
BY Arthur L. Slee
ATTY.

INVENTOR
JOSEPH W. DROLL
BY Arthur L. Lee
ATTY.

June 25, 1929.  J. W. DROLL  1,718,639
MATTRESS ROLL FORMING AND STITCHING MACHINE
Filed Aug. 17, 1926    19 Sheets-Sheet 18
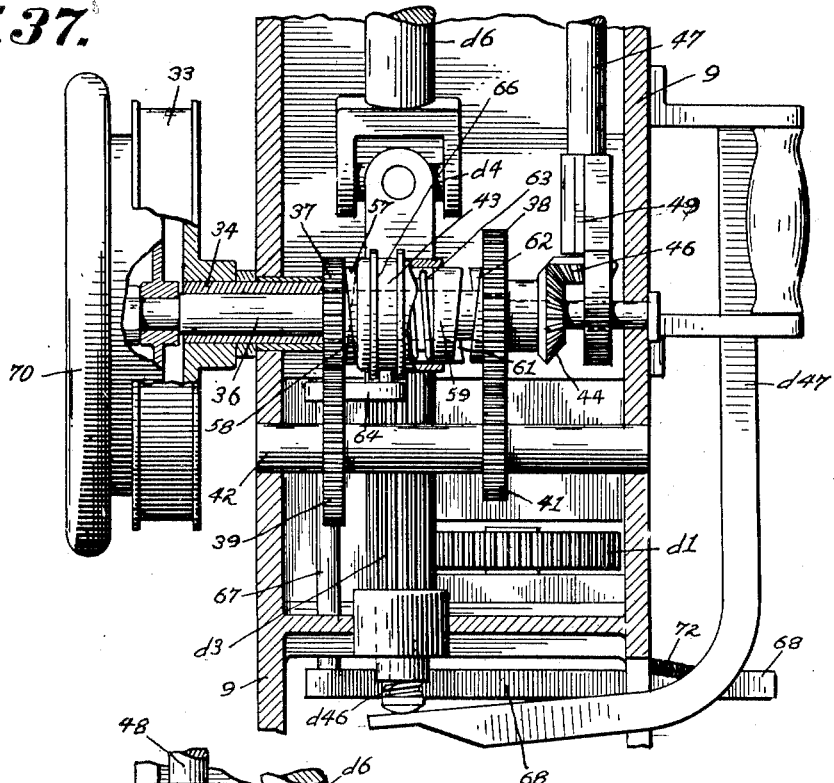
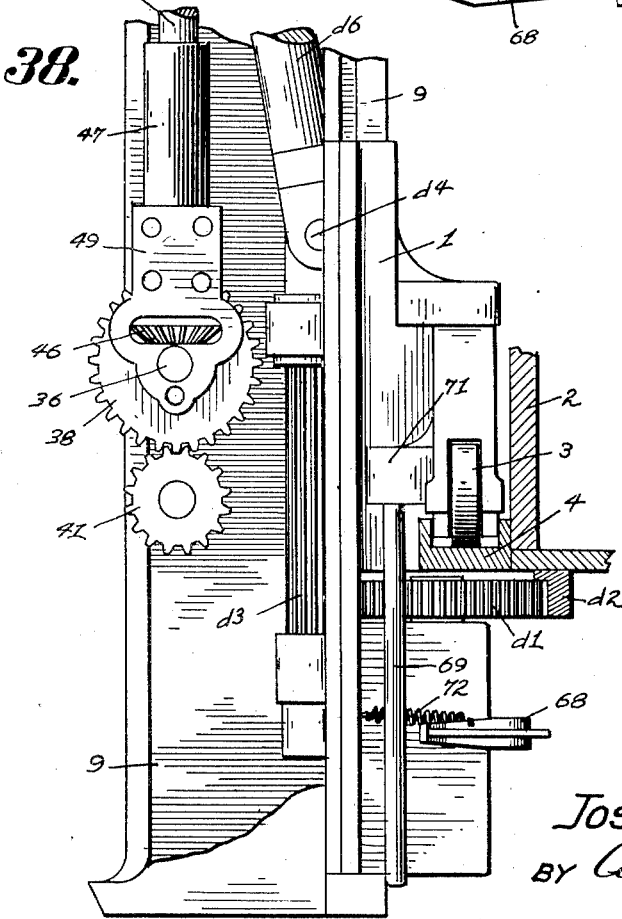
INVENTOR
JOSEPH W. DROLL
BY Arthur L. Slee
ATTY.

June 25, 1929.  J. W. DROLL  1,718,639
MATTRESS ROLL FORMING AND STITCHING MACHINE
Filed Aug. 17, 1926  19 Sheets-Sheet 19
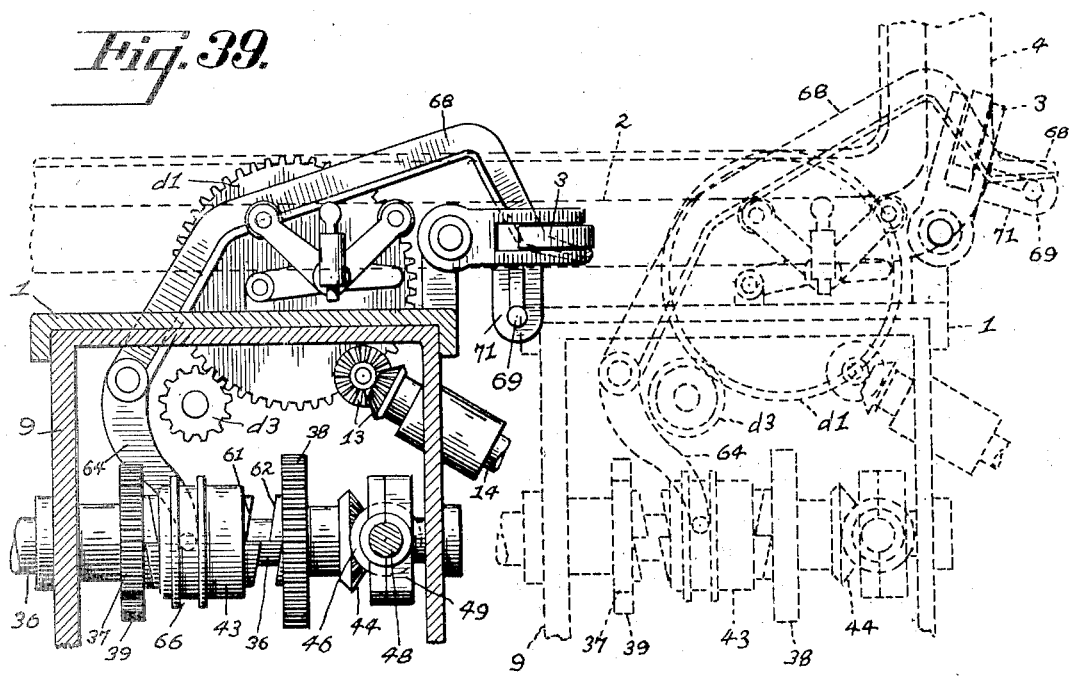
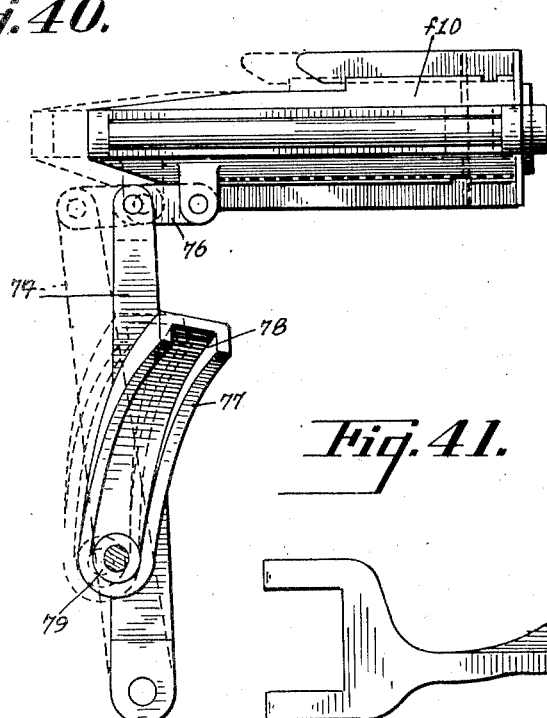
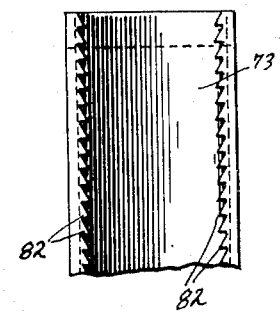
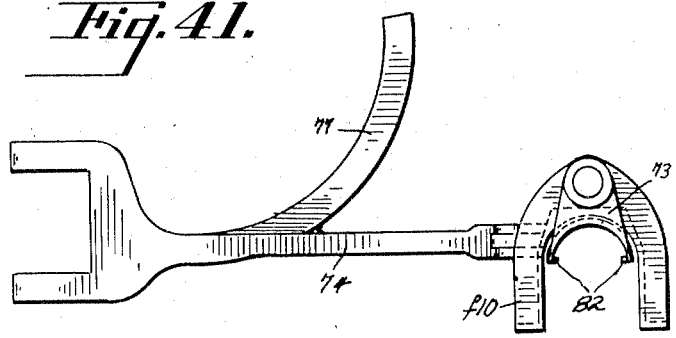
INVENTOR
JOSEPH W. DROLL
BY Arthur L. Slee
ATTY.

Patented June 25, 1929.

1,718,639

UNITED STATES PATENT OFFICE.

JOSEPH WILLIAM DROLL, OF CHICAGO, ILLINOIS.

MATTRESS-ROLL FORMING AND STITCHING MACHINE.

Application filed August 17, 1926. Serial No. 129,800.

My invention relates to improvements in roll forming and stitching machines for forming roll edges upon mattresses and the like. Reference is hereby made to my former Patents Number 1,503,351, issued July 29, 1924; Number 1,511,403, issued Oct. 14, 1924; and Number 1,519,299, issued Dec. 16, 1924, all of which disclose machines of the general type over which the present invention is an improvement.

The primary object of my invention is to provide an improved machine for forming and stitching roll edges upon mattresses.

Another object is to provide an improved machine provided with improved means for forming a roll and for holding said roll during the stitching thereof.

A further object is to provide improved means operating in conjunction with roll forming mechanism for compressing the roll during the stitching operation and for stripping the formed roll from the forming means when the forming means are withdrawn from the mattress.

Another object is to provide an improved machine of the character described provided with improved stitch forming mechanism adapted to obtain a more smooth and regular stitch formed from a single thread firmly knotted about the material embraced within each stitch to lock the same.

Another object is to provide improved means for paying out and taking up the thread during the forming of each stitch to prevent the breaking of the thread and to obtain firm regular stitching.

A further object is to provide an improved mechanism including improved means for regulating the length of thread paid out for forming each stitch.

Another object is to provide an improved mechanism operating in connection with the forming and stitching mechanism for moving the machine intermittently between stitches and for positively locking the moving mechanism and the machine against further movement after each successive movement to obtain a uniform spacing of stitches.

A further object is to provide an improved intermittent moving mechanism for a machine of the character described which may be easily and quickly set to form long or short stitches as desired.

A further object is to provide an improved machine provided with improved means for holding the mattress against movement during the forward movement of the machine to obtain a regular roll and uniform stitching.

Another object is to provide a machine of the character having improved means for varying the speed of the machine while the same is being moved around the corners of a work supporting table.

A still further object is to provide an improved machine of the character described having improved and simplified construction whereby the moving mechanism is coordinated to give increased efficiency and to produce an improved mattress.

I accomplish these and other objects by means of the improved machine disclosed in the drawings forming a part of the present specification wherein like characters of reference are used to designate similar parts throughout said specifications and drawings and in which, Fig. 1 is a side elevation of my improved mattress roll forming and stitching machine as mounted upon the edge of a work supporting table, the adjacent head cover being removed.

Fig. 2 is a rear elevation of the machine as shown in Fig. 1.

Fig. 3 is a sectional detail showing the means whereby the body of the machine is adjusted vertically with respect to its carriage.

Fig. 4 is a side elevation of the machine head with the cover removed, the figure being drawn upon a larger scale.

Figs. 5 and 6 are side elevations of the machine head with the cover and cam removed and showing various positions of the roll forming mechanism.

Fig. 7 is a broken detail showing the roll forming mechanism upon a larger scale.

Fig. 8 is a broken detail showing in side elevation the construction and operation of the roll engaging blocks.

Fig. 9 is a plan view of the elements shown in Fig. 8.

Figs. 10 and 11 are side elevations of the machine head with the cover removed showing the manner in which the sewing needle is actuated.

Fig. 12 is a broken detail of the needle and actuating connections therefore, the needle being shown in full lines in normal starting position and in dotted lines in the position reached during successive advances.

Fig. 13 is a plan view of the elements shown in Fig. 12.

Fig. 14 is a broken side elevation, partly in section, of the sewing needle, the figure being drawn upon a larger scale.

Fig. 15 is a broken detail, partly in horizontal longitudinal section of the rearward end of the needle and needle mounting.

Fig. 16 is a broken detail partly in vertical section of the shuttle and its actuating connections.

Fig. 17 is a broken front elevation of a portion of the machine head showing the construction and relation of the shuttle and thread take-up actuating connections.

Fig. 18 is a broken front elevation, drawn upon a larger scale, of the shuttle and thread take-up in normal starting position.

Fig. 19 is a similar view showing the action of the shuttle and thread take-up in forming the loop for each stitch.

Fig. 20 is a transverse horizontal section taken upon the line 20—20 of Fig. 19 in the direction indicated.

Fig. 21 is a broken sectional detail showing the tension regulating means mounted within the front of the shuttle.

Fig. 22 is a broken plan view of the shuttle showing the operation of the tension releasing means.

Fig. 23 is a broken sectional detail taken upon the line 23—23 of Fig. 21 in the direction indicated.

Fig. 24 is a broken detail showing a left side elevation of the shuttle actuating and shifting connections.

Fig. 25 is a broken detail of the thread lifting mechanism.

Fig. 26 is a broken detail showing the manner in which the thread is engaged by the sewing needle at the start of each stitch.

Figs. 27, 28 and 29, are diagrammatic views showing successive steps in the forming of a stitch.

Fig. 37 is a broken rear elevation, partly in vertical section showing the variable speed driving connections.

Fig. 38 is a broken side elevation of the driving connections shown in Fig. 37.

Fig. 39 is a horizontal section showing the construction and operation of the variable speed driving and shifting connections.

Fig. 40 is a plan view of the roll shaper and feeder and the actuating connections therefor.

Fig. 41 is a front elevation of the members shown in Fig. 40.

Fig. 42 is a bottom view of the feeder yoke.

Figure 1:
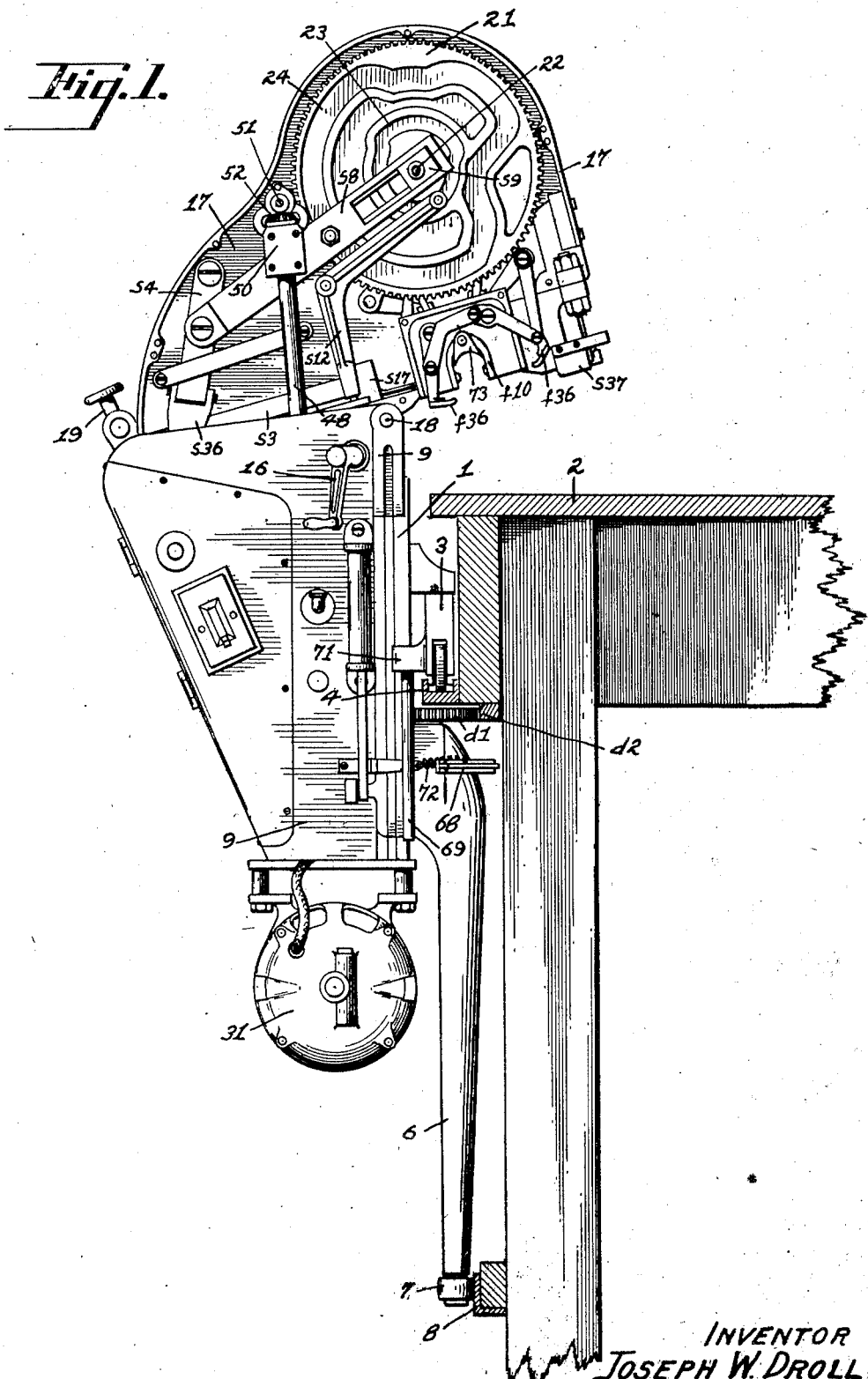

Referring to the drawings my improved machine will be seen to consist of a supporting frame designated in general by the numeral 1 movably mounted upon the edge of a work supporting table 2 by means of pivotally movable castors 3 engaging a suitable track 4 secured along the edge of the table 2. The frame 1 is braced and held in upright position by means of a downwardly extending leg 6 provided with a roller 7 arranged to engage a rail 8 mounted around the lower portion of the table 2.

A body frame 9 is slidably mounted upon the supporting frame 1 and arranged to be adjusted vertically thereon by means of a threaded shaft 11 mounted upon the frame 9 and engaging an extension 12 formed upon the frame 1. The shaft 11 is arranged to be rotated by means of suitable bevel gears 13 actuated by a shaft 14 and crank 16 extending outwardly from the side of the frame 9 whereby said frame may be raised or lowered to adjust the vertical position of the body frame relative to the supporting frame and the table for a purpose hereinafter more fully explained.

A head frame 17 is pivotally mounted as at 18 upon the body frame 9 and arranged to extend over the edge of the table 2, the inclination of said head frame relative to the body frame being made adjustable by means of a suitable adjusting member 19 mounted upon the top of the body frame adjacent the back of the head frame and in engagement therewith.

A main operating cam 21 is rotatably mounted upon the right hand side of the head frame 17 by means of a suitable cam shaft 22, said cam having inner and outer cam grooves 23 and 24 formed upon the outer face thereof and a cam groove 26 formed upon the inner face of the cam. A second driving cam 27 is mounted upon the left side of the head frame upon the shaft 22, said cam 27 being provided with an outside cam groove 28 and an inside cam groove 29.

The cam 21 is arranged to operate roll forming mechanism for forming a roll edge A around the edges of a mattress M. The forming mechanism consists of a pair of packing needles $f^1$ slidably mounted upon a pair of packing needle guides $f^2$ which in turn are slidably mounted upon arcuate guides $f^3$ secured upon the lower portion of the head frame 17 above the edge of the work supporting table 2. The needles $f^1$ are moved along the guides $f^2$ by means of links $f^4$ pivotally connected between said needles and a pair of pivotally movable actuating arms $f^5$ mounted upon suitable pivot mountings $f^7$. The actuating arms $f^6$ are provided with segment gear portions $f^8$ arranged in meshing relation whereby a pivotal movement of one arm will cause a corresponding movement of the other arm to move the needles $f^1$ longitudinally along the guides $f^2$. A lever $f^9$ is secured in connection with one of the actuating arms $f^6$ and provided with a roller $f^{11}$ mounted upon its outer end to engage the cam groove 26 formed upon the back or inner side of the cam 21 whereby said lever may be oscillated to reciprocate the packing needles $f^1$. A shaper $f^{10}$ is mounted within a recess formed in the head frame 17 between the needles $f^1$ to engage the corner of the mattress and shape the roll formed by the needles.

A pair of guide actuating arms $f^{12}$ are mounted upon the pivot mountings $f^7$ immediately in back of the arms $f^6$, said arms $f^{12}$ being provided with segment gear portions $f^{13}$ arranged in meshing relation to impart movement from one of said arms to the other. The arms $f^{12}$ are connected to the packing needle guides $f^2$ by means of links $f^{14}$ and are actuated by means of a link $f^{16}$ connected between an extension $f^{17}$ formed upon one of the arms $f^{12}$ and a lever $f^{18}$ pivotally mounted upon the head frame 17 by means of a shaft $f^{20}$ and provided with a roller $f^{19}$ arranged to engage the cam groove 26 whereby the packing needle guides $f^2$ may be moved along the arcuate guides $f^3$ to impart a pivotal movement to the packing needles $f^1$ in timed relation to the longitudinal movement of said needles along the packing needle guides $f^2$.

Figure 5:
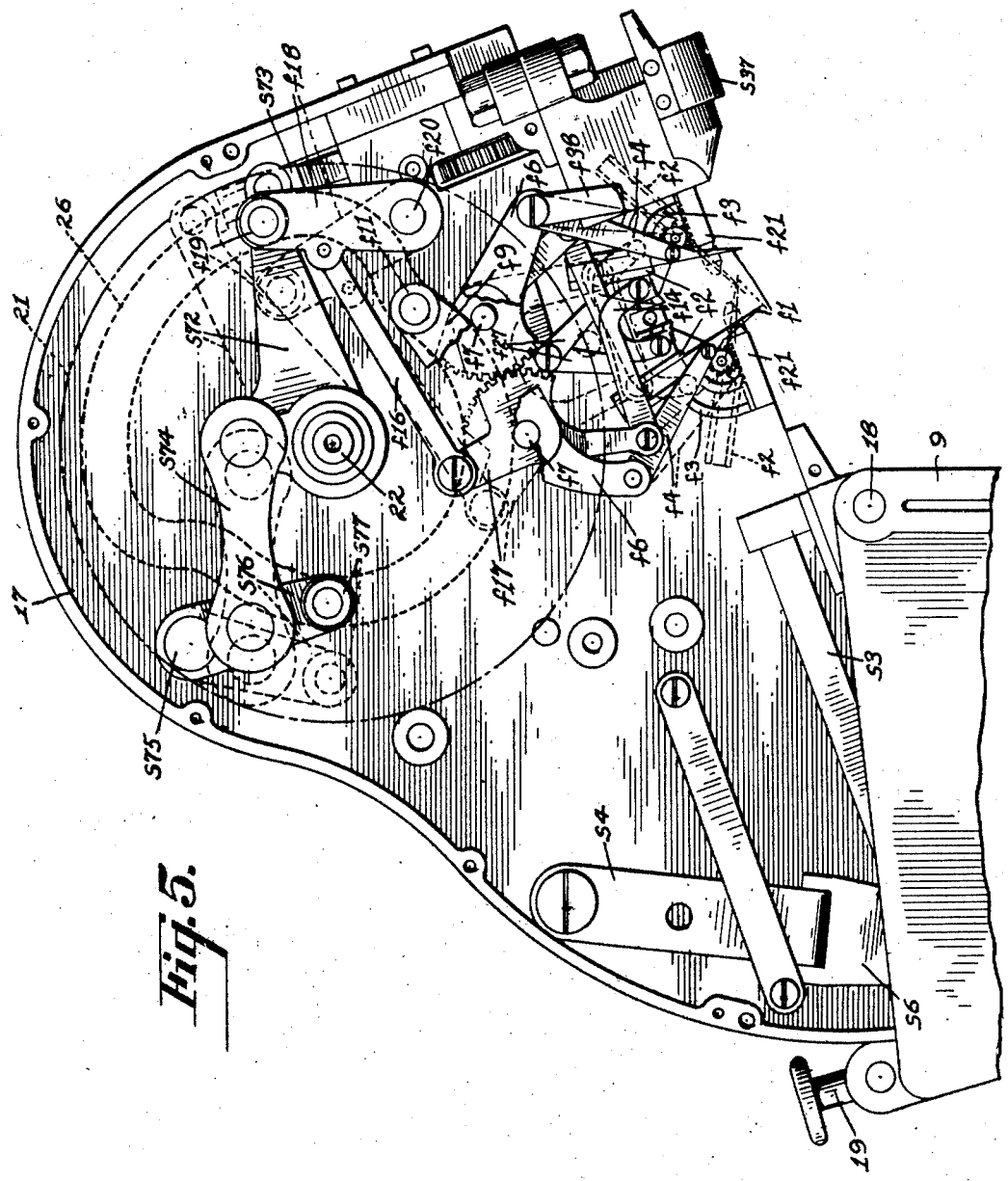
Figure 30:
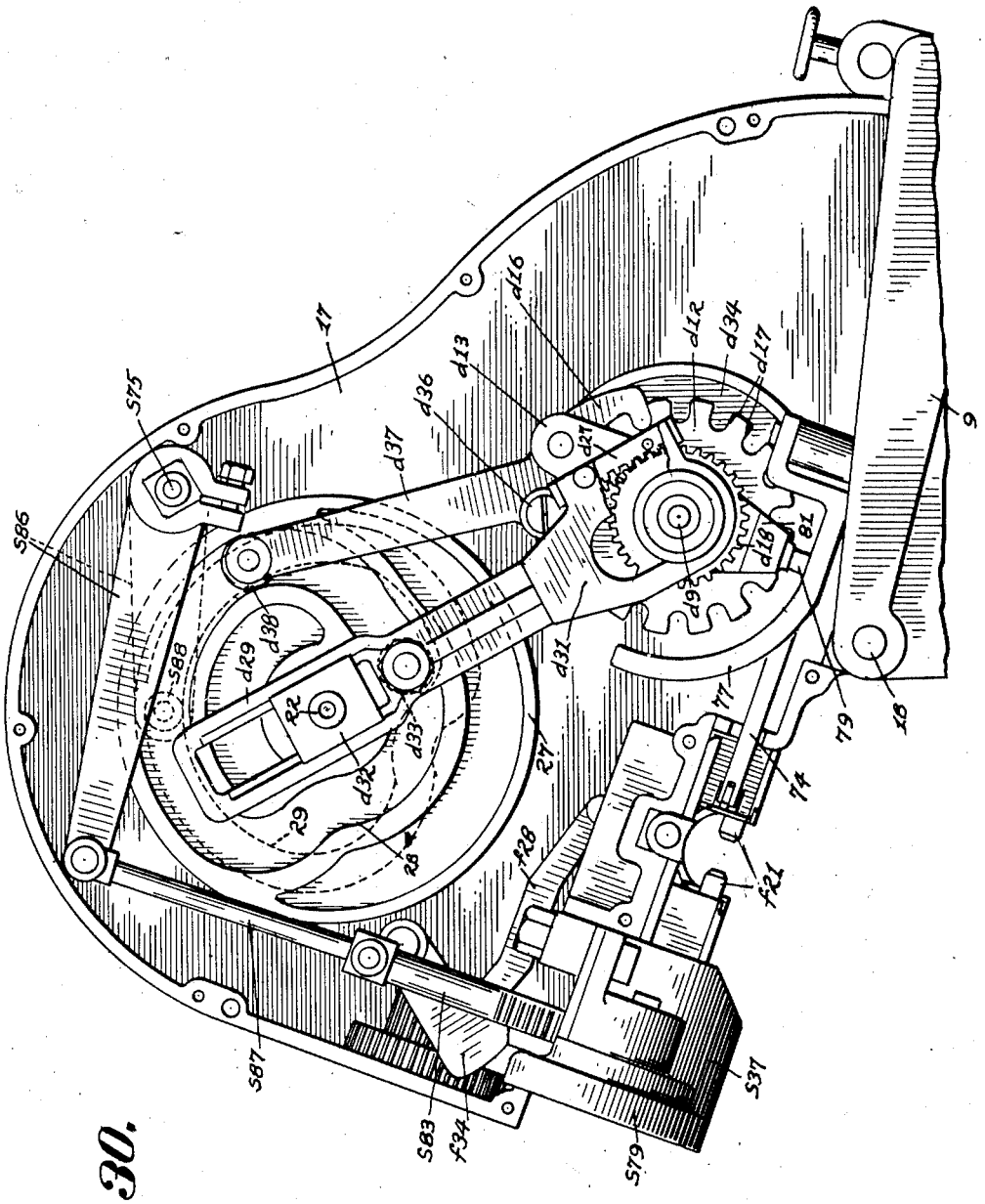
Figs. 30, 31 and 32, are left side elevations of the machine head with the cover removed and showing different positions of the mechanism.

The cam 21 is arranged to impart oscillating movement to the levers $f^9$ and $f^{18}$ in a manner such that the packing needles $f^1$ are moved from a normal starting position with the guides $f^2$ in substantially parallel relation and the needles raised to their uppermost position thereon to first penetrate the top and side of the mattress M, said needles being moved longitudinally along the guides $f^2$ to the position shown in Figs. 5 and 7 of the drawings. As the needles approach their extreme lowermost position after penetrating the mattress M the arms $f^{12}$ are moved to actuate the guides $f^2$ along the arcuate guides $f^3$ and the needles $f^1$ are moved pivotally to the position shown in dotted lines in Fig. 5 of the drawings, thereby forcing stuffing into the corner of the mattress and packing the same to form a compact roll. Subsequently the needles are withdrawn longitudinally from the mattress by moving said needles back along the guides $f^2$, to the positions shown in Fig. 6 of the drawings. As the needles disengage the mattress, the guides $f^2$ are moved back along the arcuate guides $f^3$, thereby moving said needles and the guides $f^2$ back to normal starting position as shown in dotted lines in Fig. 6 of the drawings.

A pair of roll engaging blocks $f^{21}$ are slidably mounted adjacent the packing needles $f^1$ and arranged to be moved against opposite sides of the formed roll A immediately adjacent the packing needles. The blocks $f^{21}$ are provided with rack portions $f^{22}$ arranged to be engaged by tooth segments $f^{23}$ formed upon the adjacent ends of shafts $f^{24}$ pivotally mounted within the headframe 17. Links $f^{25}$ are secured upon the opposite ends of the shafts $f^{24}$, said links being connected to a common lever $f^{28}$ by means of connecting links $f^{27}$. The lever $f^{28}$ is pivotally mounted upon a suitable pivot mounting $f^{29}$ and is provided with an extension $f^{31}$ having a roller $f^{32}$ mounted upon the end thereof and arranged to engage a groove $f^{33}$ formed in an actuating member $f^{34}$ mounted in connection with the shaft $f^{20}$ and arranged to be pivotally moved in common with the needle guide actuating lever $f^{18}$. The groove $f^{33}$ is formed with an arcuate portion concentric with the shaft $f^{20}$, whereby the lever $f^{28}$ will not be moved during the first half of the movement of the lever $f^{18}$ and member $f^{34}$. During the remainder of the movement of the member $f^{34}$ in common with the lever $f^{18}$ the lever $f^{28}$ is displaced from its normal position as shown in full lines in Fig. 8 of the drawings to the position shown in dotted lines, thereby causing the links $f^{26}$ and $f^{27}$ to partially rotate the shafts $f^{24}$ and move the blocks inwardly against the roll A being formed by the needles $f^1$. The adjacent ends of the blocks $f^{21}$ are beveled and arranged to press into the depressions formed between the roll and the body of the mattress with sufficient pressure to firmly compress the stuffing between said blocks and to firmly hold the material during the stitching of the roll as hereinafter described. The blocks $f^{21}$ remain in engagement with the mattress during the withdrawal of the packing needles 1 therefrom, thereby firmly holding the roll and mattress and stripping the formed roll from the packing needles while said needles are being withdrawn as above described.

In order to compress the mattress adjacent to and slightly in advance of the packing needles $f^1$ and thereby facilitate the movement of said needles into the mattress I provide a pair of grippers $f^{36}$ pivotally mounted upon the machine head adjacent the packing needles $f^1$. The grippers $f^{36}$ are connected by means of a link $f^{37}$ and are actuated by a link $f^{38}$ connected between one of the grippers and the adjacent needle actuating arm $f^6$ whereby the movement of said arm $f^6$ in moving the needles $f^1$ downwardly into the mattress will cause a simultaneous movement of the grippers to engage and compress the corner of the mattress slightly in advance of the needles. The grippers are shaped and arranged to engage the mattress adjacent the corner just outside of the packing needles and to extend past the side of the machine to engage the mattress slightly in advance of the packing needles whereby said mattress is shaped and partially compressed in advance of said needles. In this manner the mattress is held in such manner as to facilitate the introduction of the packing needles into the corner of the mattress and to greatly reduce the stress imposed upon said needles.

As the roll A is formed as above described, it is permanently stitched by means of a sewing needle $s^1$ mounted upon a carrier $s^2$ slidably mounted upon a guide $s^3$ which is pivotally mounted at its rearward end upon the head frame 17. The carrier $s^2$ and needle $s^1$ are arranged to be reciprocated along the guide $s^3$ by means of a lever $s^4$ pivotally mounted upon the head frame 17 and provided with a portion $s^6$ hingedly connected to said lever $s^4$ and slidably and pivotally engaging a flexible bearing $s^7$, such as a ball bearing, adapted to permit a slight transverse pivotal movement of the lever portion $s^6$ relative to the carrier $s^2$. The lever $s^4$ is actuated by means of an actuating member $s^8$ slidably engaging a bearing block $s^9$ pivotally mounted upon the cam shaft 22 and pivotally connected to said lever $s^4$. A roller $s^{11}$ is mounted upon the member $s^8$ and arranged to engage the outer cam groove 24 formed upon the cam 21, said groove 24 being shaped to cause the needle $s^1$ to be advanced twice during each complete revolution of the cam 21.

The needle $s^1$ is arranged to be shogged between successive advances by means of a bell crank $s^{12}$ provided with a cam roller $s^{13}$ mounted upon one end thereof and engaging the cam groove 23 of the cam 21, the opposite end of the crank $s^{12}$ being provided with a pin $s^{14}$ engaging a slot $s^{16}$ formed in a carrier $s^{17}$ slidably mounted upon the head frame 17 and connected to the forward end of the guide $s^3$. The slot $s^{16}$ is so inclined that the movement imparted to the crank $s^{12}$ will cause the carrier $s^{17}$ to be moved transversely to the direction of said movement, thereby causing the guide $s^3$ to be shifted upon its pivot mounting as shown in dotted lines in Fig. 13 of the drawings whereby the needle is shogged the desired amount between successive advances. The carrier $s^{17}$ is provided with a forwardly disposed extension $s^{18}$ apertured to form a guide and support for the needle $s^1$ near the point at which it penetrates the mattress.

The needle $s^1$ consists of a pointed steel shaft having an open eye $s^{19}$ formed adjacent the point thereof and having a groove $s^{21}$ formed in the outer side to receive a sewing thread. The shaft of the needle $s^1$ is secured upon a shank $s^{22}$ arranged to be detachably secured upon the carrier $s^2$, preferably by means of a spring actuated latch member $s^{23}$ slidably mounted within an extension $s^{24}$ upon the side of the carrier and arranged to engage a notch $s^{26}$ formed in the shank adjacent the forward end thereof. The shank $s^{22}$ is beveled upon the forward end opposite the notch $s^{26}$ to permit the shank to be moved inwardly past the latch and is provided with knurled portions $s^{25}$ upon the outer end whereby the shank may be rotated to move the notch out of engagement with the latch when it is desired to remove the needle and shank from the carrier.

A plunger $s^{27}$ is mounted within the shank $s^{22}$ and provided with a stem $s^{28}$ extending longitudinally through a groove $s^{29}$ extending along the under side of the needle shaft, said stem being arranged to close the open side of the eye $s^{19}$. A spring $s^{31}$ is mounted within the shank in back of the plunger to normally advance the same and cause the stem to close the eye of the needle. An actuating stem $s^{32}$ is connected to the plunger $s^{27}$ and arranged to extend outwardly from the shank in back of the needle shaft. The stem $s^{32}$ is engaged by an actuating member $s^{33}$ slidably mounted upon the carrier $s^2$ and arranged to engage a stop $s^{34}$ secured upon the head frame 17 and so positioned that the member $s^{33}$ will engage said stop $s^{34}$ just before reaching the extreme forward position for the first advance of the needle in making a stitch, thereby causing the member $s^{33}$ to move the stem $s^{32}$ and plunger $s^{27}$ rearwardly against the pressure of the spring $s^{31}$ whereby the stem $s^{28}$ is moved to open the eye $s^{19}$ of the needle when said extreme forward position is reached. The actuating member $s^{33}$ is also arranged to engage the back of the carrier $s^{17}$ just before the needle reaches its extreme forward position upon its second advance whereby the stem $s^{28}$ may be moved to open the eye $s^{19}$ when said extreme position is reached.

A shuttle, hereinafter referred to in general by the numeral $s^{56}$, is rotatably mounted within a suitable housing $s^{37}$ mounted upon the front of the head frame 17. The shuttle consists of a cylindrical sleeve designated in particular by the number $s^{36}$, rotatably mounted between a collar $s^{38}$ secured within the front of the housing $s^{37}$ and a casing $s^{39}$. The casing $s^{39}$ is provided with a shoulder $s^{41}$ formed upon the forward end and engaging a corresponding shoulder formed within the sleeve $s^{36}$. A ring $s^{42}$ is threaded or otherwise secured upon the rearward end of the casing, said ring forming a retaining shoulder engaging the inner end of the sleeve $s^{36}$ and being provided with a projection $s^{43}$ loosely engaging an opening $s^{44}$ formed in the back of the housing $s^{37}$ to prevent rotation of the casing $s^{39}$ with the sleeve $s^{36}$.

A bobbin $s^{46}$ is loosely mounted within the casing $s^{39}$. The bobbin $s^{46}$ consists of a cylindrical container arranged to receive a supply of thread $s^{47}$ to be dispensed from the shuttle to the sewing needle $s^1$ for stitching the roll A formed upon the mattress M. The thread from the bobbin is carried around a sheave $s^{48}$ rotatably mounted within a recess formed in the back of a cover member $s^{49}$ hingedly mounted upon the front of the casing $s^{39}$, said sheave being mounted in connection with a threading guide $s^{51}$ arranged to exert a slight tension upon the thread passing to the sheave. The groove of the sheave $s^{48}$ is made with convex surfaces arranged to frictionally engage the thread when said thread is drawn tight around the sheave. A plurality of apertures $s^{52}$ are formed in the sheave near the edge of the sheave to be engaged by a locking pin $s^{53}$ carried by a member $s^{54}$ slidably mounted upon the casing $s^{39}$, said member being movable against the normal pressure of a spring $s^{56}$ to move the pin $s^{53}$ out of engagement with the sheave as indicated in dotted lines in Figs. 22 and 23 of the drawings whereby the sheave is normally locked against rotation to prevent the dispensing of thread from the bobbin and is released periodically to dispense the length of thread necessary for each stitch as hereinafter more fully described.

From the sheave $s^{48}$ the thread $s^{47}$ is carried outwardly from the casing $s^{39}$ through a groove $s^{56}$ formed upon the inside of the cover $s^{49}$, thence across a groove $s^{57}$ formed in the edge of the cover and around said edge and across the face of said cover to a thread passage $s^{58}$ formed longitudinally through the opposite side of the casing $s^{39}$, said passage extending through the ring $s^{42}$ and the projection $s^{43}$ formed thereon whereby the thread is guided outwardly from the housing $s^{37}$. The thread is held across the groove $s^{57}$ by passing said thread through an aperture $s^{59}$ formed through a flange $s^{61}$ formed upon the cover member $s^{49}$, the cover and flange being beveled off and made substantially wedge shaped as best shown in Fig. 20 of the drawings to facilitate the movement of the thread around the shuttle as hereinafter more fully described.

The shuttle $s^{36}$ is provided with gear teeth $s^{62}$ formed in the outer surface thereof and arranged to mesh with a gear $s^{63}$ engaging the shuttle through registering slots formed in the collar $s^{38}$ and housing $s^{37}$ as at $s^{64}$. The gear $s^{63}$ is mounted upon a shaft $s^{66}$ upon which is also mounted a pinion $s^{67}$ driven by a gear $s^{68}$ which is mounted in connection with a pinion $s^{69}$. The pinion $s^{69}$ is engaged and actuated by means of a rack $s^{71}$ arranged to be reciprocated by means of a bell crank $s^{72}$ pivotally mounted upon the cam shaft 22 and to one end of which the rack is connected through a pivotally connected link $s^{73}$. The bell crank is actuated by a link $s^{74}$ pivotally connected between the other end of the bell crank and an actuating arm $s^{76}$ secured upon a pivot member $s^{75}$ pivotally mounted upon the head frame 17 and provided with a roller $s^{77}$ engaging the cam groove 26 formed upon the inner face of the cam 21 whereby said arm $s^{76}$ is oscillated in timed relation to the operation of the roll forming mechanism above described.

A thread dispensing and take-up means is mounted adjacent the shuttle $s^{36}$ to take up and deliver slack thread during the forming of each stitch, said means consisting of a disc $s^{78}$ rotatably mounted within the front of a housing $s^{79}$ adjacent the shuttle $s^{36}$. The disc $s^{78}$ is provided with a hook $s^{81}$ arranged to be moved through the groove $s^{57}$ and to engage the thread $s^{47}$ extending thereacross, said hook being moved by the rotation of the disc to carry a loop of the thread around a pair of sheaves $s^{82}$ mounted upon the sides of the disc. The disc $s^{78}$ is arranged to be rotated by means of a reciprocating rack $s^{83}$ mounted in meshing relation with a pinion $s^{84}$ connected to the disc. The rack $s^{83}$ is actuated by means of a bifurcated crank member $s^{86}$ pivotally mounted upon the left side of the head frame 1 upon an extension of the pivot $s^{75}$, one arm of said member $s^{86}$ being connected to the rack $s^{83}$ by means of a link $s^{87}$ while the other arm of the member $s^{86}$ is provided with a roller $s^{88}$ arranged to engage the groove 29 formed upon the inner side of the driving cam 27, the movement of the member $s^{86}$ and the rack $s^{83}$ being timed to operate the disc $s^{78}$ in timed relation to the operation of the shuttle $s^{36}$ as hereinafter more fully explained.

The rack $s^{83}$ has a cam groove $s^{89}$ formed in one side thereof and arranged to engage an extension $s^{91}$ formed upon a tension release actuating member $s^{92}$ pivotally mounted adjacent said rack and provided with an offset angularly disposed arm portion $s^{93}$ arranged to engage the outer end of the member $s^{54}$ as shown in Fig. 22 of the drawings. The groove $s^{89}$ is so arranged that the reciprocation of the rack will cause the member $s^{92}$ to be oscillated whereby the member $s^{54}$ may be moved to carry the pin $s^{53}$ alternately into and out of engagement with an aperture $s^{52}$ of the sheave $s^{48}$ whereby said sheave may be released to permit thread to be drawn from the bobbin $s^{46}$ during a limited portion of the rotation of the disc $s^{78}$ whereby only the length of thread necessary for forming each stitch may be drawn from the bobbin during each operation.

The thread $s^{47}$, carried outwardly from the shuttle $s^{36}$ through the housing $s^{37}$ as above explained, is carried into engagement with a thread lifting member $s^{94}$ slidably mounted for vertical movement within a slot $s^{96}$ formed in the outer roll engaging block $f^{21}$, the thread being carried through a notch $s^{97}$ formed in the end of the member $s^{94}$ and thence through a recess $s^{98}$ formed in the face of the block $f^{21}$ to the mattress. The member $s^{94}$ is arranged to be moved upwardly to lift the thread $s^{47}$ into engagement with the eye $s^{19}$ of the sewing needle $s^1$ when said needle reaches its extreme forward position during its first advance in forming each stitch, said member being actuated by means of a rod $s^{99}$ connected to one end of a bell crank $s^{101}$ pivotally mounted upon the cam shaft 22. The other end of the bell crank $s^{101}$ has a cam groove $s^{102}$ formed therein and arranged to be engaged by a pin $s^{103}$ mounted upon the inner arm of the bifurcated member $s^{86}$, said groove having an arcuate portion concentric with the pivot mounting $s^{75}$ of the member $s^{86}$ and an offset portion arranged to impart a slight pivotal movement to the bell crank $s^{101}$ as the pin $s^{103}$ is moved therethrough whereby the member $s^{94}$ is raised the desired amount as shown in Fig. 25 of the drawings.

The operation of the stitching mechanism is as follows: The sewing needle $s^1$ is advanced from normal position to the position indicated in Fig. 26 of the drawings, said needle passing through suitable openings formed in the roll engaging blocks $f^{21}$, and being forced through the mattress immediately adjacent the roll. As the needle approaches the extreme position the eye $s^{19}$ is opened by the operation of the plunger $s^{27}$ above described and the lifting member $s^{94}$ is moved to lift the thread upwardly into the now open eye $s^{19}$. The needle is then withdrawn from the mattress and a loop of thread is drawn through the opening formed by the needle, the thread forming said loop being paid off from the sheaves $s^{82}$ which are rotated to pay off thread at the same rate that it is being drawn past the shuttle and through the mattress by the sewing needle.

As the sewing needle $s^1$ approaches its normal position the guide $s^3$ is shifted to shog the needle whereby the needle is caused to penetrate the mattress at a point slightly spaced from the point of the first penetration. In thus shogging the needle the loop of thread carried thereby is carried around a loop retaining element $s^{104}$ as shown in Fig. 27. As the needle is now advanced for the second time, the thread extending to the needle from the shuttle is carried under the element $s^{104}$ and held in engagement therewith by the shaft of the needle. The portion of the loop extending from the previous stitch formed in the mattress slips over the end of the element $s^{104}$ as shown in Fig. 28 and is drawn tight against the side of the mattress as indicated in dotted lines in said figure. During the second advance the needle $s^1$ enters the shuttle housing $s^{37}$ and at the end of the advance is disposed in proximate relation to the side of the shuttle $s^{36}$, said needle passing the shuttle through an opening $s^{106}$ formed in the collar $s^{38}$, one strand of the loop of thread being held adjacent the shuttle $s^{36}$. The eye of the needle is opened as the needle reaches the extreme forward position as above described.

The strand of the loop which is moved adjacent the shuttle $s^{36}$ is slackened by the first rearward movement of the needle $s^1$ and is picked up and the thread moved out of engagement with the needle eye $s^{19}$ by means of a hook $s^{107}$ formed in the surface of the shuttle $s^{36}$ to which an anti-clockwise rotation is imparted at the instant the needle $s^1$ begins to recede to extreme position. The strand of thread picked up by the shuttle is received within grooves $s^{108}$ formed in the surface of the shuttle and inclined toward the hook $s^{107}$, a loop of the thread being moved between the shuttle and the collar $s^{38}$ and carried entirely around the shuttle. During the second advance of the sewing needle and the subsequent rotation of the shuttle to carry the loop around said shuttle, the disc $s^{78}$ and sheaves $s^{82}$ are caused to rotate in anti-clockwise direction to pay off the loop of thread carried thereby. When the loop has been entirely paid off from the sheaves $s^{82}$ a slightly further movement of the rack $s^{83}$ causes the member $s^{92}$ to be moved as shown in Fig. 22 of the drawings, thereby moving the member $s^{54}$ to the positions shown in dotted lines in Figs. 22 and 23 whereby the pin $s^{53}$ is moved out of engagement with the sheave $s^{48}$, thus permitting said sheave to be rotated and the length of thread necessary to complete the operation to be drawn over said sheave from the bobbin $s^{46}$.

When the thread is engaged by the hook $s^{107}$ and carried out of engagement with the needle $s^1$, the strand of thread not engaged by the shuttle is carried into a notch $s^{109}$ formed in the collar $s^{38}$ immediately below the groove $s^{106}$ whereby said strand is held while the loop is being carried around the shuttle as indicated in dotted lines in Fig. 18 of the drawings. At the same time the strand is held in back of the element $s^{104}$ during the return movement of the needle. As the loop carried by the shuttle passes the center of the shuttle, the thread is thrown into a slack loop as shown in Fig. 19 of the drawings. At about the same time the needle $s^1$ is moved rearwardly past the element $s^{104}$ thereby releasing the strand held by the needle in engagement with said element. During the last part of the rotation of the shuttle $s^{36}$ the disc $s^{78}$ is started to rotate in a clockwise direction, thereby causing the hook $s^{81}$ to again pick up the thread from across the groove $s^{57}$ and to carry a loop around the sheaves $s^{82}$ as indicated in dotted lines in Fig. 19. The first upward movement of the rack $s^{83}$ in rotating the disc $s^{78}$ causes the member $s^{92}$ to return to normal position and releases the member $s^{54}$ to move the pin $s^{53}$ into engagement with the sheave $s^{48}$, thereby locking said sheave and preventing thread from being drawn from the bobbin. The clockwise rotation of the disc $s^{78}$ causes the slack thread resulting from the release of the loops extending around the shuttle and around the retaining element $s^{104}$ to be taken up and carried into a loop extending around the sheaves $s^{82}$, the thread being drawn in the manner indicated in dotted lines in Fig. 29 of the drawings to form a knot embracing the portion of the mattress between the two penetrations made by the needle $s^1$.

In carrying the strand of thread in a loop around the shuttle $s^{36}$ the strand is carried under the standing portion of the thread extending through the casing to the mattress and then carried back and over said portion of the thread extending from the casing to the previously formed stitch on the mattress, thus forming a single knot. In order that the thread may be carried past the projection $s^{43}$ without injury to the thread, I provide a shuttle shifting means consisting of a rod $s^{112}$ normally held clear of the shuttle $s^{36}$ and ring $s^{42}$ and arranged to be moved to engage a notch $s^{113}$ formed in said ring $s^{42}$. The rod is operated as shown in Fig. 24 of the drawings by means of a bell crank $s^{114}$ pivotally mounted in back of the bell crank $s^{72}$, said crank $s^{114}$ having one arm connected to the rod by means of a link $s^{116}$. The other arm of the bell crank $s^{114}$ is provided with a cam slot $s^{117}$ arranged to engage a pin $s^{118}$ mounted upon the back of the adjacent arm of the crank $s^{72}$ whereby the operation of said arm $s^{72}$ in actuating the shuttle rotating means as above explained will operate to press the rod $s^{112}$ downwardly into engagement with the notch $s^{113}$, thereby shifting the ring $s^{42}$ in timed relation to the rotation of the shuttle $s^{36}$ in carrying the loop around said shuttle whereby the loop may be carried around the projection $s^{43}$.

After the forming of the stitch as above described, the shuttle $s^{36}$ is rotated in clockwise direction to return idle to normal starting position and the disc $s^{78}$ rotated to draw the stitch tight and to retain the thread to be paid out in forming the succeeding stitch.

The machine is driven intermittently along the edge of the work supporting table 2 by mechanism operated by the cam 27 in timed relation to the operation of the forming and stitching mechanism above described.

The intermittent driving mechanism consists of a suitable gear $d^1$ rotatably mounted upon the supporting frame 1 of the machine and arranged to mesh with a rack $d^2$ extending around the work supporting table 2 as best shown in Fig. 38. The gear $d^2$ is driven by an elongated pinion $d^3$ rotatably mounted upon the body frame 9 of the machine, said pinion being elongated to permit vertical adjustment of the body frame relative to the supporting frame as hereinbefore explained without disengaging the gear $d^2$. The pinion $d^3$ is driven through a suitable flexible connection $d^4$ by a shaft $d^6$ extending upwardly into the lower portion of the head of the machine and provided at its upper end with a suitable bevel gear $d^7$. The shaft $d^6$ is supported at its upper end by means of a bearing $d^8$ pivotally hung upon a transverse shaft $d^9$ mounted within the head of the machine.

A bevel gear $d^{11}$ rotatably mounted upon the transverse shaft $d^9$ is secured in connection with a driving and locking member $d^{12}$. An actuating member is mounted upon the shaft $d^9$ adjacent the driving and locking member $d^{12}$, said actuating member comprising an arm $d^{13}$ connected to a sleeve portion $d^{14}$ extending outwardly along the shaft $d^9$. A pawl $d^{16}$ is pivotally mounted upon the arm $d^{13}$ to engage recesses $d^{17}$ formed in the periphery of the member $d^{12}$. Gears $d^{18}$ and $d^{19}$ are rotatably mounted upon the sleeve portion $d^{14}$, said gears being of different diameters and arranged to be independently keyed to the shaft $d^9$ by means of keys $d^{22}$ mounted upon a sleeve $d^{21}$ slidably mounted upon the shaft $d^9$ inside of the sleeve portion $d^{14}$. The sleeve $d^{21}$ is slidably movable along the shaft $d^9$ and the keys extend outwardly through slots $d^{23}$ formed in the sleeve portion $d^{14}$ to engage either gear $d^{18}$ or $d^{19}$. An annular flange $d^{24}$ is formed upon the outer end of the sleeve $d^{21}$ to form a handle whereby the sleeve may be moved along the shaft $d^9$ and retaining means $d^{26}$ is provided for retaining the sleeve in engagement with either gear $d^{18}$ or $d^{19}$.

The gears $d^{18}$ and $d^{19}$ are arranged to be driven by a pair of reciprocating racks $d^{27}$ and $d^{28}$ respectively, said racks being mounted upon a slide $d^{29}$ slidably mounted at its lower end upon the sleeve portion $d^{14}$ by means of slots formed in spaced arms $d^{31}$ extending over the sleeve portion upon opposite sides of the gears $d^{18}$ and $d^{19}$. The upper end of the slide $d^{29}$ is slotted to engage a guide $d^{32}$ mounted upon the cam shaft 22. A roller $d^{33}$ is mounted upon the back of the slide $d^{29}$ and arranged to engage the cam groove 28 of the cam 27 whereby the slide is reciprocated in timed relation to the roll forming and stitching mechanism.

Figure 31:
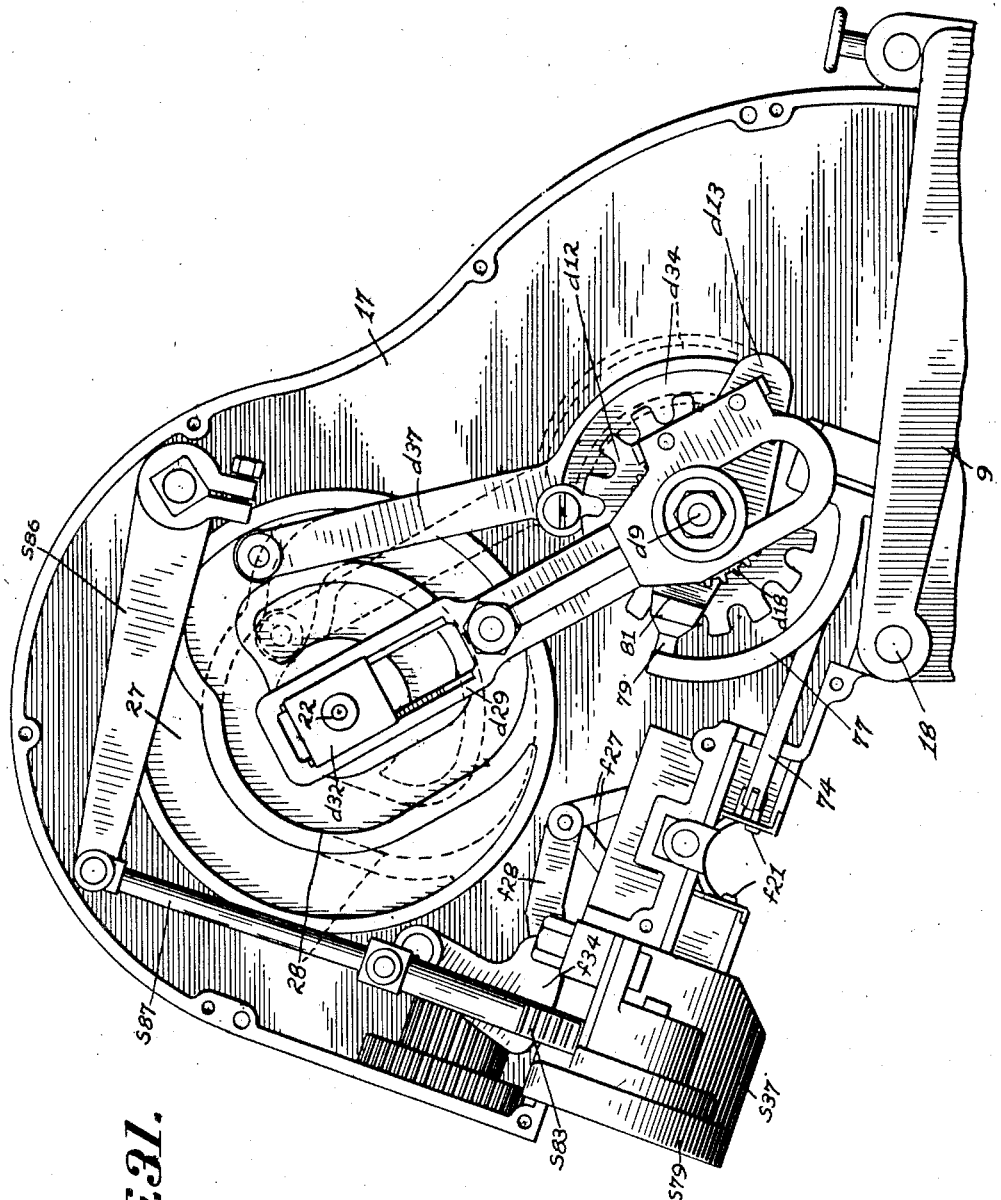
Figure 32:
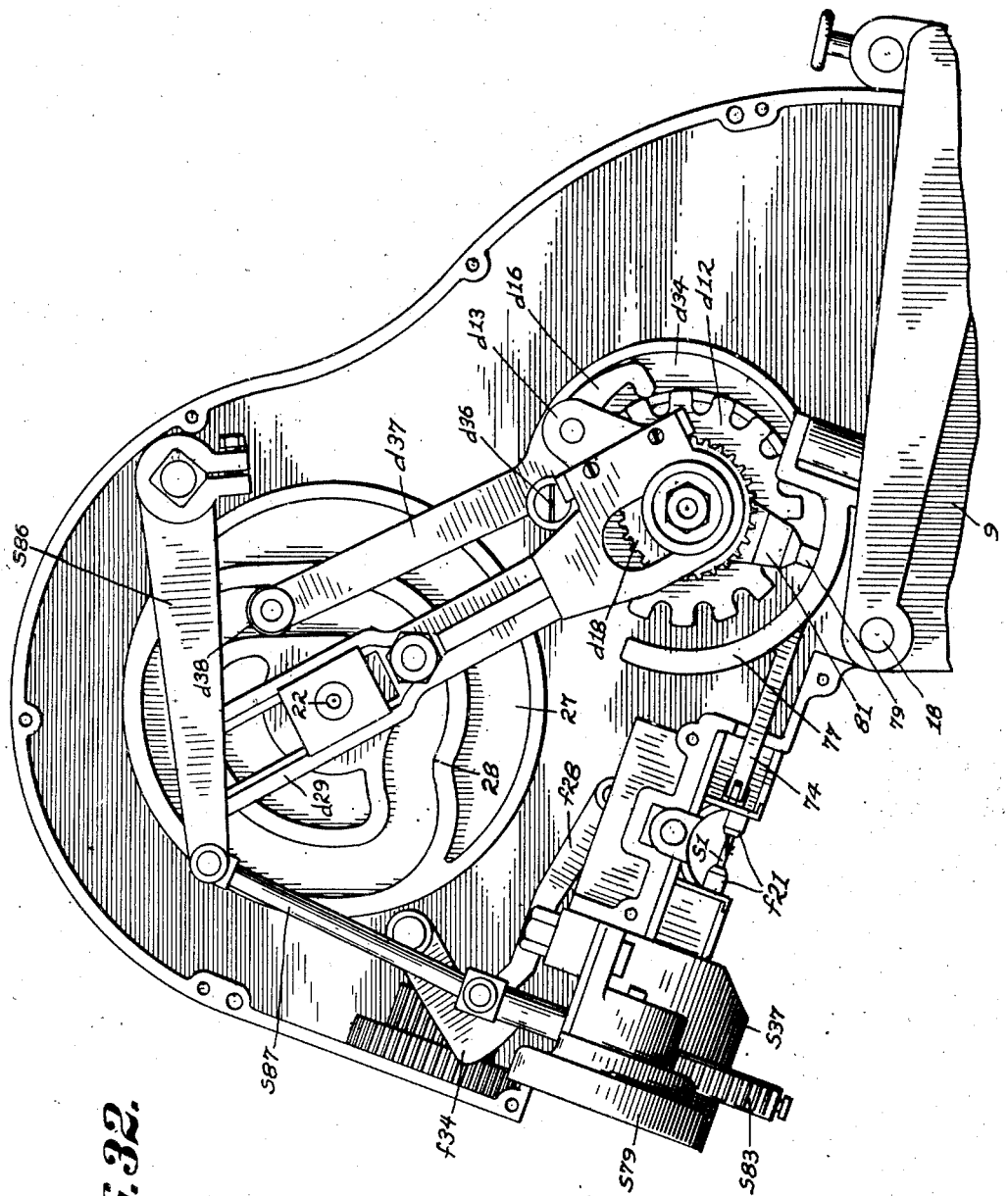
Figure 33:
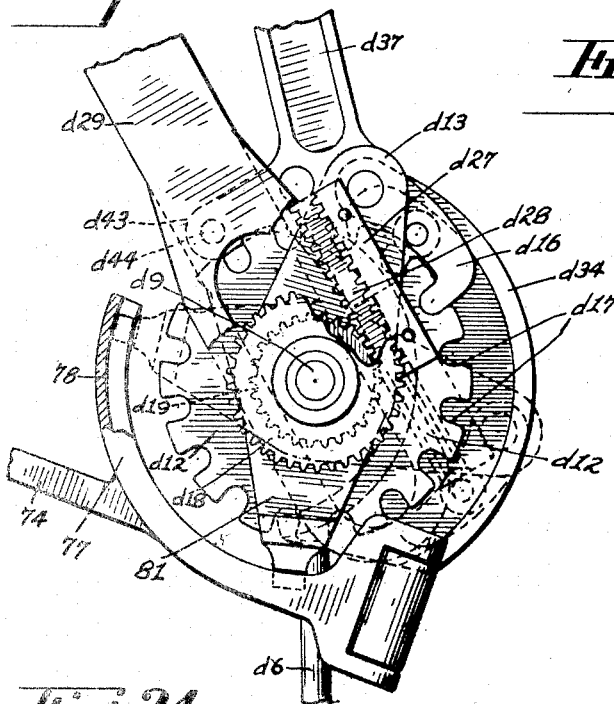
Fig. 33 is a broken side elevation of the intermittent movement actuating mechanism.
Figure 34:
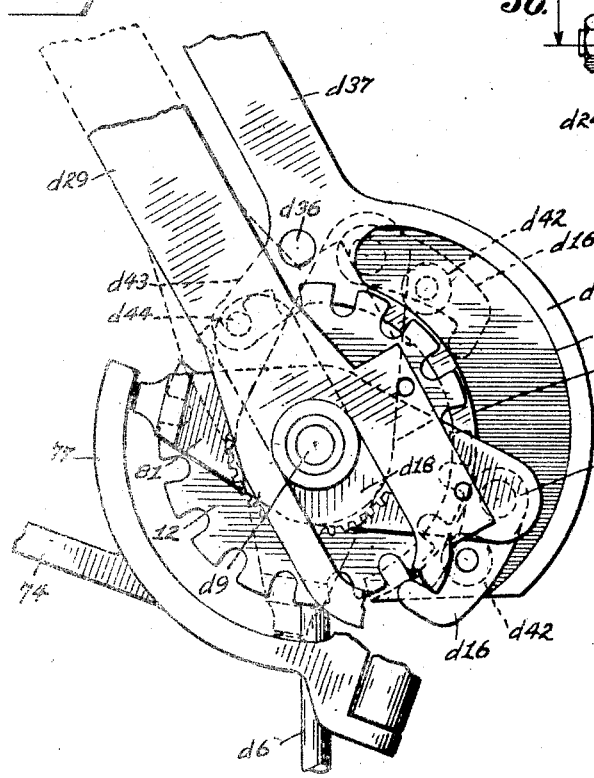
Fig. 34 is a similar view showing the manner in which the machine is locked against movement during the return movement of the actuating connections.
Figure 35:
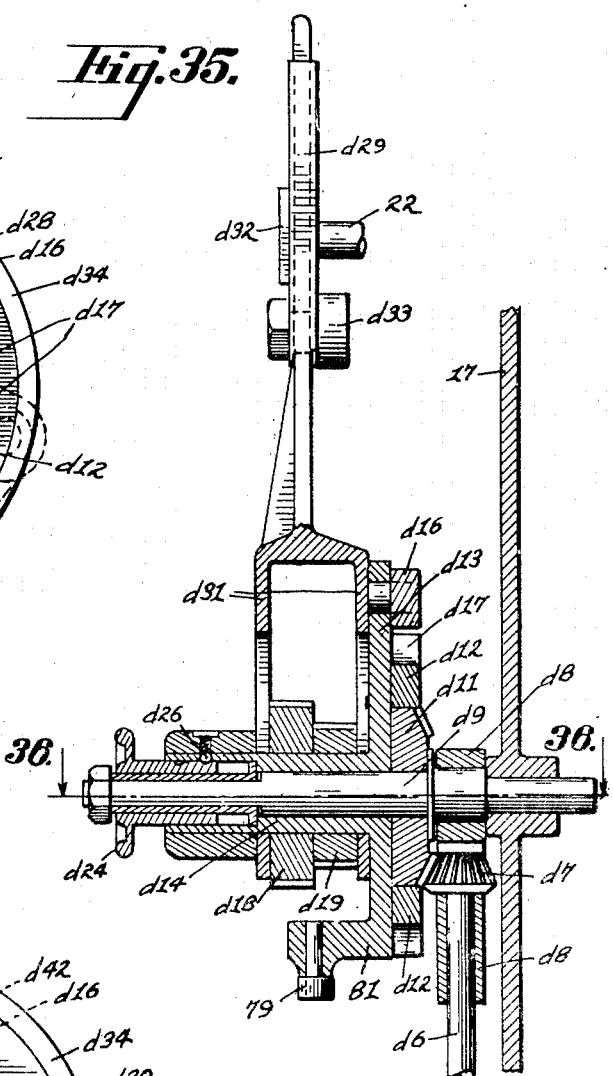
Fig. 35 is a broken vertical section of the mechanism shown in Figs. 33 and 34.
Figure 36:
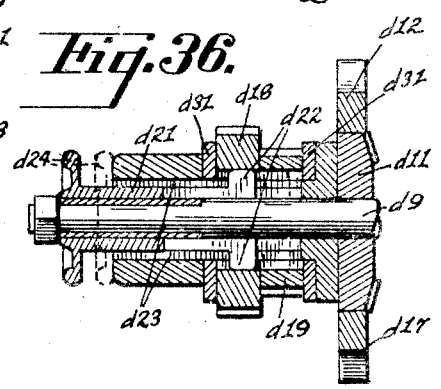
Fig. 36 is a section taken upon the line 36—36 of Fig. 35.

The pawl $d^{16}$ is arranged to engage the driving member $d^{12}$ while the racks $d^{27}$ and $d^{28}$ are moved in one direction and to disengage the driving member while the racks are returned in the opposite direction, said pawl being controlled by a member $d^{34}$ pivotally mounted as at $d^{36}$ and actuated by means of an extension $d^{37}$ provided with a roller $d^{38}$ engaging the cam groove 28 of the cam 27. Arcuate cam surfaces $d^{39}$ and $d^{41}$ are formed upon the pawl controlling member $d^{34}$ to engage a roller $d^{42}$ mounted upon the back of the pawl $d^{16}$. The cam surface $d^{39}$ is arranged to be concentric with the driving member $d^{12}$ when the member $d^{34}$ is in operating position, said cam surface $d^{39}$ being arranged to move and hold the pawl in engagement with a recess of the driving member during the driving stroke of the slide $d^{29}$. At the end of the driving stroke the member $d^{34}$ is shifted from the position shown in full lines to the position indicated in dotted lines in Fig. 31 of the drawings. The cam surface $d^{41}$ now operates to force and hold the pawl $d^{16}$ out of engagement with the driving member during the return stroke of the slide $d^{29}$, said cam surface arranged to be eccentric with the driving member when the member $d^{34}$ is in this position. The reciprocating movement of the slide $d^{29}$ operating through the rack and gear connections and the sleeve portion $d^{14}$ causes the actuating arm $d^{13}$ to be oscillated upon the shaft and the pawl, controlled by the member $d^{34}$ caused to operate the driving member $d^{12}$ and the bevel gear $d^{11}$ whereby the machine is moved intermittently along the table. The gears $d^{18}$ and $d^{19}$ are made of different sizes whereby either a short or long stitch may be obtained by moving the keys $d^{22}$ into operative engagement with a desired gear to obtain a long or short movement as desired.

In order to prevent the machine from being carried by momentum past the desired point the pawl controlling member $d^{34}$ is provided with an extension $d^{43}$ having a locking pin $d^{44}$ secured thereon and arranged to be moved into engagement with a recess $d^{17}$ of the driving member $d^{12}$ at the moment the pawl $d^{16}$ is moved out of engagement with said driving member. The locking pin $d^{44}$ forms a positive stop locking the driving member $d^{12}$ and gear $d^{11}$ against further rotation and preventing further movement of the machine along the table until the pawl is again moved into engagement with the member $d^{12}$ as above explained. A suitable clutch $d^{46}$ is mounted in connection with the pinion $d^{8}$ and actuated by a hand lever $d^{47}$ whereby the intermittent driving mechanism may be disconnected and the machine moved manually along the table when desired.

The entire machine is operated by a suitable motor 31 mounted upon the bottom of the body frame 9. The motor delivers power through a suitable belt 32 operating over a pulley 33 secured upon sleeve 34 rotatably mounted upon a main transverse shaft 36 mounted within the body frame 9. The sleeve is connected to a gear 37 rotatably mounted upon the shaft 36. A second gear 38 is rotatably mounted upon the shaft 36 in spaced relation to the gear 37. The gears 37 and 38 are arranged in meshing relation with speed reducing gears 39 and 41 respectively, said gears 39 and 41 being secured upon a jack shaft 42. A clutch designated in general by the numeral 43 is feathered upon the shaft 36 between the gears 37 and 38 as shown in Figs. 37 and 39 of the drawings, said clutch being movable in a manner hereinafter more fully described to engage either gear and operate the machine at high or low speed as desired. A bevel gear 44 secured upon the end of the shaft 36 is arranged in meshing relation with a bevel gear 46 secured upon a sleeve 47 feathered upon the lower end of a cam driving shaft 48. The sleeve 47 is rotatably engaged by a suitable bearing 49 pivotally mounted upon the shaft 36 while the upper end of the shaft 48 is engaged within a similar bearing 50 pivotally mounted upon a shaft 51 mounted within the head frame 17 and provided with a bevel gear 52 meshing with a bevel gear 53 secured upon the upper end of said shaft 48. A gear 54 is secured upon the shaft 51 and arranged to mesh with gear teeth 56 formed upon the periphery of the cam 21 for driving the same. The pivotal movement afforded by the bearings 49 and 50 together with the sliding movement permitted by the feathered connection between the sleeve 47 and shaft 48 permits the inclination of the head to be adjusted by pivotal movement upon its pivot mounting 18.

The clutch 43 consists of an outer shell slidably keyed upon the shaft 36 and having a clutch face 57 formed thereon to engage a corresponding clutch face 58 formed upon the adjacent gear 37. A block 59 is slidably mounted within the opposite end of the shell, said block being slidably keyed on to the shaft 36 and provided with a clutch face 61 arranged to engage a corresponding clutch face 62 formed upon the gear 38. The block 59 is arranged to be pressed inwardly against the pressure of a spring 63 mounted within the shell and arranged to normally hold the block in a normal outwardly extending position as best shown in Fig. 37 of the drawings.

The clutch is operated by means of an arm 64 engaging a groove 66 formed in the surface of the shell 43, said arm being secured upon the upper end of a shaft 67 mounted upon the body frame 9 of the machine. An actuating lever 68 is secured upon the shaft 67. The lever 68 extends outwardly through the front of the frame 9 and is shaped to extend under the table 2 to a point below the forward castor 3 by which the machine is supported along the edge of the table. A rod 69 is secured upon a lateral extension 71 formed upon the castor mounting, said rod extending downwardly past the end of the lever 68. While the machine is operating along a side of the table 2, the rod 69 clears the lever 68 and permits the clutch to be held by a suitable spring 72 in normal position, the gear 37 being engaged by said clutch and the shaft 36 rotated directly thereby. When the machine starts to round a corner of the table, the forward castor 3, following the track 4 is swung inwardly and the rod 69 caused to engage the lever 68 and displace the same as indicated in dotted lines in Fig. 39 of the drawings. The lever is held in displaced position until the machine has substantially rounded the corner, the displacement being sufficient to cause the clutch 43 to be shifted to disengage the gear 37 and to engage the gear 38. In this position the power from the pulley is communicated through the gear 37 to the speed reducing gears 39 and 41. The gear 41 drives the gear 38 which is engaged by the clutch 43 and caused to operate the shaft 36 at reduced speed while the machine is rounding the corner. As soon as the machine has rounded the corner the clutch is automatically returned to normal position by the spring 72 and the operation of the machine continued along the side of the table at normal speed.

The sliding clutch block 59 is provided in order to insure engagement with the gear 38 when the clutch is moved out of engagement with the gear 37. The block normally extends outwardly sufficiently to cause the clutch face 61 to engage the face 62 before the gear 37 is disengaged. The clutch and the gear 38 turn in the same direction, but at different speeds. When the clutch block moves against the gear 38, the block is forced inwardly against the pressure of the spring 63 to permit the clutch block which is moving at the greater speed to slide past the clutch teeth of the gear 38. As soon as the clutch disengages the gear 37 the spring forces the block 59 into engagement with the gear 38, said clutch and the shaft 36 thereafter being driven by said gear 38 at slower rate but without interruption to the operation of the machine. A hand wheel 70 is secured upon the shaft 36 for adjusting the mechanism to starting position or for other purposes as desired.

During the intermittent forward movement of the machine along the table 2 there is a normal tendency for the mattress to be carried along with the machine due to the tension of the stitching thread and the friction between the formed roll and the shaper $f^{10}$. To overcome this tendency and to insure regularity of the stitching, the shaper $f^{10}$ is provided with a feeder yoke 73 slidably mounted within the upper portion of the shaper $f^{10}$ to define the back of said shaper. The yoke 73 is arranged to be reciprocated by means of an arm 74 pivotally mounted upon the head frame 17 of the machine adjacent the driving member $d^{12}$ and connected to the yoke by a link 76. The arm 74 is provided with a cam portion 77 having a cam groove 78 formed therein. A roller 79 is mounted upon the end of an extension 81 formed upon the pawl actuating member $d^{13}$ and arranged to engage the cam groove 78. When the arm $d^{13}$ is operated to move the machine along the edge of the table as above described, the extension 81 and roller 79 are similarly moved and the cam 77 and arm 74 operated to move the yoke 73 relative to the machine in a direction opposite to the direction of movement of said machine and at the same rate. The yoke, while being moved relative to the machine is thus held stationary with respect to the mattress, the amount of movement of the yoke relative to the machine being equal to the distance through which the machine is moved. The yoke is provided with rearwardly faced teeth 82 best shown in Fig. 42, arranged to engage the mattress and prevent forward movement of the mattress relative to the yoke during the forward movement of the machine. After the machine has come to rest and while the driving mechanism is being returned idle to normal starting position the yoke will be moved from the position indicated in dotted lines in Fig. 40 of the drawings to the normal position shown in full lines, the rearwardly faced teeth 82 sliding over the mattress while the roll is firmly held by the roll forming mechanism.

The cams 21 and 27 are keyed upon the shaft 22 whereby they are rotated together to operate the roll forming mechanism, the stitching mechanism, and the intermittent movement driving mechanism, in accurately timed relation whereby successive operations are co-ordinated to obtain a smooth efficient operation. The cams are rotated continuously while the machine is in operation, the cycle of operation being as follows.

Assuming the machine to have just completed the forward movement after the completion of a preceding stitch, the forming needles $f^1$ are moved into the corner of the mattress M in substantially parallel relation and the grippers $f^{36}$ moved to engage and compress the roll edge, the movement of said needles and grippers being started just prior to the end of the forward movement so that the mattress will be engaged at the instant the forward movement ends. The needle guides $f^2$ are then moved along the arcuate guides $f^2$ to turn the needles inwardly and pack stuffing into the corner of the mattress, the blocks $f^{21}$ being moved inwardly to engage the roll and compress the same during the last part of said movement. Just before the packing needles $f^1$ reach the extreme inwardly turned position, the sewing needle $s^1$ is started to move forward upon its first advance so as to penetrate the mattress at substantially the instant the packing needles reach said extreme position. At the instant the sewing needle reaches the extreme forward position upon its first advance the thread lifting means $s^{94}$ is actuated to move the thread into the eye $s^{19}$. As the needle is withdrawn from the mattress a loop of thread is drawn through the compressed edge of the mattress. Just before reaching the extreme rearward position the needle is shogged, the pivotal movement being acomplished while the needle completes the rearward movement and starts forward upon the second advance without causing an appreciable halt in the movement of said sewing needle. At the end of the second advance of the needle $s^1$ the loop of thread carried back through the mattress is picked up and carried around the shuttle as above explained, thereby locking the stitch, thread being paid off from the sheaves $s^{82}$ and then taken up to draw the stitch tight as hereinbefore described.

The packing needles $f^1$, grippers $f^{36}$, and blocks $f^{21}$ hold the roll firmly during the forming of the stitch. After the sewing needle has been withdrawn from the second advance, the packing needles are moved outwardly and the grippers moved to disengage the mattress, the packing needles being moved outwardly along the lines of their longitudinal axes while the guides $f^2$ remain in their shifted position upon the arcuate guides $f^3$ whereby the needles are withdrawn without disturbing the stuffing packed into the corner of the mattress. After the needles $f^1$ disengage the mattress, but before the needles reach their extreme position, the guides $f^2$ are moved back along the arcuate guides to straighten the needles up to normal starting position. The blocks $f^{21}$ are not moved out of engagement until after the packing needles $f^1$ disengage the mattress, thereby holding the roll during the withdrawal of the the needles and stripping the packed and sewed roll from said needles.

The intermittent moving mechanism remains idle and the machine is locked as above explained during the above forming and stitching operations. As soon as the stitch is formed and the roll disengaged, the slide $d^{29}$ is actuated to move the machine along the edge of the table the desired distance, and the roll forming and stitching mechanism returned to normal position and held idle until the forwardward movement is completed.

The movement of the mechanism is so regulated as to avoid all lost motion and to obtain increased speed and efficiency. Thus the operation of the packing needles overlaps the operation of the forward moving mechanism slightly, so that said needles will be in motion before the machine halts and will penetrate the mattress at the instant the forward motion ends. In like manner the operation of the sewing needle overlaps the operation of the forming needles so that the operative phases may be co-ordinated without the loss of time. The longitudinal and pivotal movement of the packing needles $f^1$ and of the sewing needle $s^1$ are likewise timed to overlap sufficiently to avoid lost time between successive operations thereby increasing the speed and efficiency of the machine.

The intermittent movement is so regulated and controlled in conjunction with the forming and stitching means that a firm and perfectly regular stitch is obtained. This is particularly important because of the improved appearance given the mattress. After the roll edge has been formed around one side of the mattress it is turned over and a similar roll formed around the other side. By adjusting the mattress and machine in starting so that the stitches formed in the second roll are directly opposite the stitches of the first roll formed, a regular plaited appearance is obtained. As the length and form of the stitches are perfectly regular, the initial adjustment in starting the second roll is all that is necessary to obtain this plaited appearance.

The body frame 9 is slidably mounted for vertical adjustment upon the supporting frame 1 in order that the machine may be adjusted to operate upon mattresses of various thicknesses, the head being adjusted to a desired distance above the work supporting table. The head of the machine is made pivotally adjustable in order to vary the angle at which the former needles $f^1$ penetrate the corner of the mattress, thereby varying the angle at which the roll is formed. These adjustments are made manually to suit any particular type of mattress.

While I have illustrated and particularly described what I now regard as the preferred construction of my improved machine, the numerous elements are of course subject to modification in many ways without altering the principle or operation of the machine and without departing from the spirit of my invention. I therefore do not wish to restrict myself to the specific details of construction shown and described but I desire to avail myself of all modifications and substitutions which may fall within the scope of the appended claims.

Having thus described my invention what I claim as new and desire to secure by Letters Patent is:

1. In a mattress stitching machine adapted to be moved intermittently along the edge of a mattress, a pair of slidably and pivotally mounted packing needles arranged to enter the mattress adjacent a corner thereof, to pack stuffing into said corner to form a roll; and a pair of grippers pivotally mounted adjacent the needles and arranged to be moved to engage and compress the corner of the mattress adjacent to and in advance of the needles.

2. In a mattress stitching machine adapted to be moved intermittently along the edge of a mattress, a pair of slidably and pivotally mounted packing needles arranged to enter the mattress adjacent a corner thereof, to pack stuffing into said corner to form a roll; a pair of grippers pivotally mounted adjacent to the needles and arranged to be moved to engage and compress the corner of the mattress to and in advance of the needles; and a pair of former blocks slidably mounted adjacent the needles and movable into engagement with the formed roll to hold the same during the stitching thereof, and to strip the formed roll from the packing needles when said needles are withdrawn from the mattress.

3. In a mattress stitching machine adapted to be moved intermittently along the edge of a mattress, a pair of slidably and pivotally mounted packing needles arranged to enter the mattress adjacent a corner thereof, to pack stuffing into said corner to form a roll therealong; and a pair of grippers pivotally mounted adjacent the needles and arranged to be moved simultaneously with said needles to engage and compress the corner of the mattress adjacent to and in advance of said needles.

4. In a mattress stitching machine adapted to be moved intermittently along the edge of a mattress, a pair of slidably and pivotally mounted packing needles arranged to enter the mattress adjacent a corner thereof, to pack stuffing into said corner to form a roll therealong; and a pair of grippers pivotally mounted adjacent the needles and arranged to be moved simultaneously with said needles, and by a common actuating connection to engage and compress the corner of the mattress adjacent to and in advance of said needles.

5. In a mattress stitching machine adapted to be moved intermittently along the edge of a mattress, a pair of slidably and pivotally mounted packing needles arranged to enter the mattress adjacent a corner thereof, to pack stuffing into said corner to form a roll therealong; and a pair of grippers pivotally mounted adjacent the needles and arranged to be moved simultaneously with said needles, and by a common actuating connection to engage and compress the corner of the mattress adjacent to and in advance of said needles; and a pair of former blocks slidably mounted adjacent the needles and movable into engagement with the formed roll to hold the same during the stitching thereof, and to strip the formed roll from the packing needles when the same are withdrawn from the mattress.

6. In a mattress stitching machine adapted to be moved intermittently along the edge of a mattress, a pair of slidably and pivotally mounted packing needles arranged to enter the mattress adjacent a corner thereof, to pack stuffing into said corner to form a roll; and a pair of former blocks slidably mounted adjacent the needles; said blocks being provided with rack portions formed thereon; pinions meshing with the rack portions; and means operating in timed relation to the operation of the packing needles for actuating the pinions to move the blocks into engagement with the formed roll to hold the same during the stitching thereof, and to strip said formed roll from the packing needles when said needles are withdrawn from the mattress.

7. In a mattress roll forming and stitching machine, a pair of slidable blocks; rack portions formed upon the blocks; pinions mounted in meshing relation with the rack portions and means for partially rotating the pinions in timed relations with the operation of roll forming and stitching mechanism to move said blocks into engagement with the formed roll to hold said roll during the stitching thereof, and to strip said roll from the forming mechanism.

8. In a mattress roll forming and stitching machine, comprising a pair of slidably and pivotally mounted packing needles arranged to enter a mattress adjacent the sides of one corner thereof to pack stuffing into said corner and to form a roll, and a stitching needle operated in timed relation to the operation of the packing needles to stitch the formed roll, a pair of blocks slidably mounted at one side of the packing needles and apertured to permit the movement of the stitching needle therethrough; and means for moving the blocks into engagement with the depressed portions of the roll to hold said roll during the stitching thereof, and to strip said roll from the forming needles when said needles are withdrawn from the mattress.

9. In a mattress roll forming and stitching machine, comprising a pair of slidably and pivotally mounted packing needles arranged to enter a mattress adjacent a corner thereof to pack stuffing into said corner to form a roll and a stitching needle operated in timed relation to the operation of the packing needles to stitch the formed roll, a pair of blocks slidably mounted adjacent the packing needles and apertured to permit the movement of the stitching needle therethrough; and means for moving the blocks into engagement with the formed roll to hold the same during the stitching thereof, and to strip said roll from the forming needles when said needles are withdrawn from the mattress; and means formed upon one of the blocks for engaging and temporarily retaining a loop of thread during the forming of each stitch.

10. In a mattress roll forming and stitching machine, the combination with packing needles arranged to enter a corner of a mattress to form a roll therealong, a sewing needle arranged to penetrate the formed roll, and means for dispensing thread to the sewing needle for stitching said roll, of means operated in timed relation to the operation of the sewing needle and thread dispensing means for moving said thread into threaded relation with said sewing needle.

11. In a mattress roll forming and stitching machine, the combination with packing needles arranged to enter a corner of a mattress to form a roll therealong, a sewing needle arranged to penetrate the formed roll, and means for dispensing thread to the sewing needle for stitching said roll, of a thread carrier slidably mounted adjacent the thread dispensing means; and means operated in connection with the thread dispensing means for actuating said carrier to move the thread into engagement with the sewing needle for forming each stitch.

12. In a mattress roll forming and stitching machine, the combination with packing needles arranged to enter a corner of a mattress to form a roll therealong, a sewing needle arranged to penetrate the formed roll, and means for dispensing thread to the sewing needle for stitching the roll, of a pair of former blocks slidably mounted adjacent the packing needles and movable to engage the formed roll, said blocks being apertured to permit the movement of the sewing needle therethrough; a thread carrier slidably mounted in connection with one of said blocks; and means of actuating said carrier to move the thread into engagement with the sewing needle for forming each stitch.

13. In a mattress roll forming and stitching machine, the combination with packing needles arranged to enter a corner of a mattress to form a roll therealong, a sewing needle arranged to penetrate the formed roll, and means for dispensing thread to the sewing needle for stitching the roll, of a pair of former blocks slidably mounted adjacent the packing needles and movable to engage the formed roll, said blocks being apertured to permit the movement of the sewing needle therethrough; a thread carrier slidably mounted in connection with one of said blocks; means for actuating said carrier to move the thread into engagement with the sewing needle for forming each stitch; and means formed upon the other block for temporarily retaining a loop of the thread during the forming of each stitch.

14. In a mattress stitching machine, a sewing needle; a shuttle mechanism arranged to dispense thread to the needle to make a stitch through the edge of a mattress and including a shuttle; means for actuating said shuttle to disengage said thread from the needle and carry a loop of said thread around the shuttle to lock the stitch; a member mounted at one side of the shuttle and arranged to be operated in timed relation thereto to take up and pay out slack thread during the forming of each stitch.

15. In a mattress stitching machine, a sewing needle; a shuttle mechanism arranged to dispense thread to the needle to make a stitch through the edge of a mattress and including a shuttle; means for actuating said shuttle to disengage the thread from the needle and to carry a loop of said thread around the shuttle to lock the stitch; a member rotatably mounted at one side of the shuttle and arranged to take up and pay out slack thread during the forming of each stitch, said member provided with a hook arranged to pick up a loop of thread from the shuttle; and means for actuating said member in timed relation to the movement of the shuttle in forming each stitch.

16. In a mattress stitching machine, a sewing needle; a shuttle mechanism arranged to dispense thread to the needle to make a stitch through the edge of a mattress and including a shuttle; means for actuating said shuttle to disengage the thread from the needle and to carry a loop of said thread around the shuttle to lock the stitch; means mounted at one side of the shuttle for taking up and paying out thread during the forming of each stitch, said means consisting of a hook arranged to pick up a loop of thread from the shuttle and sheaves mounted upon each side of the hook to carry the strands of the loop; and means for rotating said hook and sheaves in timed relation to the operation of the shuttle and needle in forming each stitch.

17. In a mattress stitching machine, a sewing needle; a shuttle mounting member; shuttle mechanism mounted upon said mounting member and including a rotatable shuttle; a bobbin mounted within the mounting member to dispense thread through the shuttle to the needle to make a stitch through the edge of a mattress; means for actuating the shuttle to disengage the thread from the needle and to carry a loop of said thread over the shuttle to lock the stitch; a member rotatably mounted adjacent the shuttle and actuated in timed relation thereto for taking up and paying out slack thread during the forming of each stitch; and means for limiting the length of thread drawn from the bobbin during the forming of each stitch.

18. In a mattress stitching machine, a sewing needle; a shuttle mounting member; shuttle mechanism mounted upon the mounting member and including a rotatable shuttle; a bobbin mounted within the mounting member to dispense thread through the shuttle to the needle to make stitches through the edge of a mattress; means for actuating the shuttle to disengage the thread from the needle and to carry a loop of said thread over the shuttle to lock each stitch; a member rotatably mounted adjacent the shuttle and actuated in timed relation thereto for taking up and paying out slack thread during the forming of each stitch; a sheave rotatably mounted within the mounting member to guide the thread from the bobbin outwardly to the shuttle; means for locking the sheave against rotation; and means for releasing said sheave for a predetermined interval during the forming of each stitch whereby the required amount of thread may be drawn from the bobbin.

19. In a mattress stitching machine, a sewing needle; a shuttle mounting member; shuttle mechanism mounted upon the mounting member and including a rotatable shuttle; a bobbin mounted within the mounting member to dispense thread through the shuttle to the needle to make stitches through the edge of a mattress; means for actuating the shuttle to disengage the thread from the needle and to carry a loop of said thread over the shuttle to lock each stitch; a member rotatably mounted adjacent the shuttle and actuated in timed relation thereto for taking up and paying out slack thread during the forming of each stitch; a sheave rotatably mounted within the shuttle mounting member and arranged to guide the thread outwardly from the bobbin to the shuttle, said sheave being arranged to frictionally engage the thread, whereby the thread may be dispensed only by a rotation of the sheave; a locking member slidably mounted adjacent the sheave and arranged to normally lock said sheave against rotation; and means actuated in timed relation to the operation of the shuttle for moving said locking member to release the sheave and permit the required length of thread to be dispensed for each stitch.

20. In a mattress stitching machine, a sewing needle; shuttle mechanism comprising a shuttle mounting member, a shuttle rotatably mounted upon said mounting member and a bobbin arranged to dispense thread through the shuttle to the needle to make stitches through the edge of a mattress; means for actuating the shuttle to disengage the thread from the needle and to carry a loop of said thread over the shuttle to lock each stitch; and means for shifting the mounting member upon its axis in timed relation to the rotation of the shuttle thereon to permit the movement of the loop around the shuttle and mounting member.

21. In a mattress stitching machine, a sewing needle; shuttle mechanism comprising a shuttle mounting member, a shuttle rotatably mounted upon said mounting member, and a bobbin arranged to dispense thread through the shuttle to the needle to make stitches through the edge of a mattress; means for actuating the shuttle to disengage the thread from the needle and to carry a loop of said thread over the shuttle to lock the stitch; a plunger slidably mounted adjacent the shuttle mounting member, said plunger normally clearing the mounting member to permit the movement of the loop between said member and the plunger; and means for moving said plunger in timed relation to the rotation of the shuttle to engage the mounting member and shift the same upon its axis to permit the loop to be moved entirely around said mounting member and the shuttle.

22. In a mattress stitching machine, a slidably and pivotally movable sewing needle arranged to penetrate the edge of a mattress at spaced points therealong for each stitch to be formed therethrough; shuttle mechanism arranged to dispense thread to form successive stitches, said mechanism including a shuttle; means for moving the thread from the shuttle mechanism into engagement with the needle during the first advance thereof, whereby a loop of thread may be drawn through the mattress and carried back through said mattress by the second advance of the needle; and means for actuating the shuttle to disengage the thread from the needle during the second advance and to carry a loop of said thread around the shuttle to lock each stitch formed.

23. In a mattress stitching machine, a slidably and pivotally movable sewing needle arranged to penetrate the edge of a mattress at spaced points therealong for each stitch to be formed therethrough; shuttle mechanism arranged to dispense thread to form successive stitches, said mechanism including a shuttle; means for moving the thread from the shuttle mechanism into engagement with the needle during the first advance thereof, whereby a loop of thread may be drawn through the mattress and carried back through said mattress by the second advance of the needle; and means for actuating the shuttle to disengage the thread from the needle during the second advance and to carry a loop of said thread around the shuttle to lock each stitch formed; and means mounted adjacent the shuttle and actuated in timed relation thereto for taking up and paying out slack thread during the forming of each stitch.

24. In a mattress stitching machine, a slidably and pivotally movable sewing needle arranged to penetrate the edge of a mattress at spaced points therealong for each stitch to be formed therethrough; shuttle mechanism arranged to dispense thread to form successive stitches, said mechanism including a shuttle; means for moving the thread from the shuttle mechanism into engagement with the needle during the first advance thereof, whereby a loop of thread may be drawn through the mattress and carried back through said mattress by the second advance of the needle; and means for actuating the shuttle to disengage the thread from the needle during the second advance and to carry a loop of said thread around the shuttle to lock each stitch formed; means mounted adjacent the shuttle and actuated in timed relation thereto for taking up and paying out slack thread during the forming of each stitch; and means for limiting the amount of thread dispensed for each stitch.

25. In a mattress stitching machine, a slidably and pivotally movable sewing needle arranged to penetrate the edge of a mattress at spaced points therealong for each stitch formed therethrough; shuttle mechanism arranged to dispense thread to the needle to form successive stitches, said mechanism including a shuttle, a bobbin mounted within the shuttle to dispense thread through the shuttle to the needle; means for moving the thread from the shuttle into engagement with the needle during the first advance thereof for each stitch, whereby a loop may be drawn through the mattress at one point and carried back through said mattress at a different point by the second advance of the needle; means for actuating the shuttle to disengage the thread from the needle during the second advance thereof, and to carry a loop of said thread around the shuttle to lock each stitch formed; means mounted adjacent the shuttle and actuated in timed relation thereto for taking up and paying out slack thread during the forming of each stitch; a thread engaging member mounted adjacent the bobbin, said member being arranged to frictionally engage the thread to regulate the dispensing of said thread from the bobbin; locking means normally engaging the thread engaging member to normally prevent the dispensing of thread from the bobbin; and means operated in timed relation to the operation of the shuttle and slack paying means for releasing said thread engaging member to dispense the required amount of thread for each stitch.

26. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the cam; a pinion mounted upon the shaft; a reciprocating driving rack meshing with said pinion, said last mentioned driving rack being guided in meshing relation with the pinion at all times, means directly connected between said driving rack and the driving cam for reciprocating said driving rack; and means connected between the pinion and the gear for actuating the same to move the machine intermittently along the table in timed relation to the operation of the roll forming and stitching mechanism.

27. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the cam; a pinion mounted upon the shaft; a driving rack meshing with the pinion; means directly connected between the driving rack and the driving cam for reciprocating said driving rack; a driving member mounted upon the shaft; means connected between the pinion and the driving member for actuating said member when the pinion is rotated in one direction and for releasing said member when the pinion is rotated in the opposite direction; and means connected between said driving member and the gear for moving the machine intermittently along the edge of the table in timed relation to the operation of the roll forming and stitching mechanism.

28. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pinion mounted upon the shaft; a driving rack meshing with the pinion; means directly connected between the driving rack and the driving cam for reciprocating said rack; a driving member mounted upon the shaft; means connected between the pinion and the driving member for actuating said member when the pinion is rotated in one direction and for releasing said member when the pinion is rotated in the opposite direction for its return movement; means connected between said driving member and the gear for moving the machine intermittently along the edge of the table in timed relation to the operation of the roll forming and stitching mechanism; and means for locking the driving member against movement during the return movement of the driving rack and pinion.

29. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pinion mounted upon the shaft; a driving rack meshing with the pinion; means connected between the driving rack and the driving cam for reciprocating said rack; a driving member mounted upon the shaft; a pawl mounted in connection with the pinion and arranged to engage the driving member; means actuated in timed relation to the movement of the driving rack for moving the pawl into engagement with the driving member when said pinion is rotated in one direction and for moving the pawl out of engagement with said driving member when the pinion is rotated in the opposite direction; and means connected between the driving member and the gear for moving the machine intermittently along the edge of the table in timed relation to the operation of the roll forming and stitching mechanism.

30. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pinion mounted upon the shaft; a driving rack meshing with the pinion; means connected between the driving rack and the driving cam for reciprocating said rack; a driving member mounted upon the shaft; a pawl mounted in connection with the pinion and arranged to engage the driving member; means actuated in timed relation to the movement of the driving rack for moving the pawl into engagement with the driving member when said pinion is rotated in one direction and for moving the pawl out of engagement with said driving member when the pinion is rotated in the opposite direction for its return movement; means connected between the driving member and the gear for moving the machine intermittently along the edge of the table in timed relation to the operation of the roll forming and stitching mechanism; and means engaging the driving member to lock said member and the machine against movement during the return movement of the driving rack and pinion.

31. In a mattress stitching machine adapted for mounting upon the edge of a work supporting table having a rack secured upon the edge thereof and including a cam arranged to actuate roll forming and stitching mechanism and a driving cam, a gear mounted upon the machine in meshing relation with the rack; a shaft mounted adjacent the driving cam; a pinion mounted upon the shaft; a driving rack meshing with the pinion; means connected between the driving rack and the driving cam for reciprocating said rack; a driving member mounted upon the shaft; a pawl mounted in connection with the pinion and arranged to engage the driving member; a pawl controlling member pivotally mounted adjacent the driving member and connected to the cam to be oscillated in timed relation to the operating of the driving rack, said member being arranged to move and hold the pawl in engagement with the driving member when the pinion is rotated in one direction and to move and hold the pawl out of engagement with said driving member when said pinion is rotated in the opposite direction; and means connected between the driving member and the gear for moving the machine intermittently along the edge of the table in timed relation to the operation of the roll forming and stitching mechanism.

32. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pinion mounted upon the shaft; a driving rack meshing with the pinion; means connected between the driving rack and the driving cam for reciprocating said rack; a driving member mounted upon the shaft; a pawl mounted in connection with the pinion and arranged to engage the driving member; a pawl controlling member pivotally mounted adjacent the driving member and connected to the driving cam to be oscillated in timed relation to the operation of the driving rack, said member being arranged to move and hold the pawl in engagement with the driving member when the pinion is rotated in one direction and to move and hold the pawl out of engagement with said driving member when said pinion is rotated in the opposite direction for its return movement; means connected between the driving member and the gear for moving the machine intermittently along the edge of the table in timed relation to the operation of the roll forming and stitching mechanism; and means connected to the pawl actuating member and arranged to engage the driving member to lock said member and the machine against movement during the return movement of the driving pinion and rack.

33. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pair of pinions mounted upon said shaft, said pinions being of different diameters; a pair of driving racks meshing with the pinions; means directly connected between the driving racks and the driving cam for reciprocating said racks; means connected between the shaft and the gear for actuating said gear to move the machine intermittently along the table in timed relation to the operation of the roll forming and stitching mechanism; and means for securing either of the pinions to the shaft whereby the amount of movement may be varied to obtain a long or short stitch.

34. In a mattress stitching machine adapted for mounting upon the edge of a work supporting table having a rack secured upon the edge thereof and including a cam arranged to actuate roll forming and stitching mechanism and a driving cam; a gear mounted upon the machine in meshing relation with the rack; a shaft mounted adjacent the driving cam; a pair of pinions mounted upon the shaft, said pinions being of different diameters; a pair of driving racks meshing with the pinions; means directly connected between the driving racks and the driving cam for reciprocating said racks; a driving member mounted upon the shaft; means connected between the driving member and the gear for moving the machine intermittently along the edge of the table in timed relation to the operation of the roll forming and stitching mechanism; means for securing either of the driving pinions to the shaft; and means mounted in connection with the shaft and arranged to engage the driving member for moving said driving member when the pinions are rotated in one direction and to disengage said driving member when the pinions are rotated in the opposite direction.

35. In a mattress stitching machine adapted for mounting upon the edge of a work supporting table and including a cam arranged to actuate roll forming and stitching mechanism, driving means for moving the machine intermittently along the edge of the table in timed relation to the operation of the roll forming and stitching mechanism; a roll shaper member arranged to receive the corner of a mattress pressed therein by the forming means to shape the roll and to engage the formed roll; and means connected to and actuated by the driving means for moving said shaper member and mattress rearwardly relative to the machine and thereby hold the mattress against movement relative to the table during the forward movement of the machine.

36. In a mattress stitching machine adapted for mounting upon the edge of a work supporting table and including a cam arranged to actuate roll forming and stitching mechanism, driving means for moving the machine intermittently along the edge of the table in timed relation to the operation of the roll forming and stitching mechanism; a roll shaper member mounted adjacent the roll forming mechanism and arranged to receive the corner of a mattress pressed therein by the forming means to shape the roll and to engage the formed roll; a shaper actuating member pivotally mounted upon the machine and pivotally connected to the shaper; and means connected to and operating in connection with the driving means for moving said shaper actuating member to move the shaper in the opposite direction during the forward movement of the machine and at the same rate as said machine whereby the mattress and shaper may be moved rearwardly relative to the machine and thereby held against movement during the forward movement relative to the table of the machine along the table.

37. In a mattress stitching machine adapted for mounting upon the edge of a work supporting table and including a cam arranged to actuate roll forming and stitching mechanism, driving means for moving the machine intermittently along the edge of the table in timed relation to the operation of the roll forming and stitching mechanism; a roll shaper member mounted adjacent the roll forming mechanism and arranged to engage the formed roll; a shaper actuating member pivotally mounted upon the machine and pivotally connected to the shaper; a cam portion formed in connection with said actuating member; and means connected to and operating in connection with the driving means and engaging the cam portion of the shaper actuating member for moving the shaper in a direction opposite to the movement of the machine and at the same rate to move the shaper and mattress rearwardly relative to the machine and thereby hold the mattress against movement relative to the table during the forward movement of the machine thereon.

38. In a mattress stitching machine adapted for mounting upon the edge of a work supporting table and including a cam arranged to actuate roll forming and stitching mechanism, driving means for moving the machine intermittently along the edge of the table in timed relation to the operation of the roll forming and stitching mechanism; a roll shaper member mounted adjacent the roll forming mechanism and arranged to engage the formed roll; a shaper actuating member pivotally mounted upon the machine and pivotally connected to the shaper; a cam portion formed in connection with the actuating member; means connected to and operating in connection with the driving means and engaging the cam portion of the shaper actuating member for moving the shaper alternately in opposite directions, said shaper being moved in a direction opposite to the movement of the machine and at the same rate during said forward movement; and rearwardly faced teeth formed in connection with the shaper member to engage the formed roll whereby relative movement between the mattress and the machine is obtained.

39. In a mattress stitching machine comprising roll forming and stitching mechanism and driving means therefor, castors mounted upon the machine and arranged to support the same upon the edge of a work supporting table, the castors being pivotally movable for rounding the corners of the table; driving means for moving the machine intermittently along the edge of the table; variable speed gears mounted in connection with the driving means for varying the speed at which the machine is operated and moved along the table; a clutch slidably mounted in connection with the driving means for normally connecting the driving means directly to the machine and movable to operatively connect the gears into connection with the driving means for driving the machine at a different speed; a lever pivotally mounted upon the machine and arranged to engage and move the clutch;

and means connected to a castor and movable therewith to engage and move the lever and thereby shift the clutch while the machine is moved around the corners of the table.

40. In a mattress stitching machine comprising roll forming and stitching mechanism and driving means therefor, castors mounted upon the machine and arranged to support the same upon the edge of a work supporting table, the castors being pivotally movable for rounding the corners of said table; a drive shaft; a driving sleeve mounted upon the drive shaft; means actuated by the drive shaft for moving the machine intermittently along the edge of the table; speed reducing gears mounted in connection with the drive shaft and driving sleeve; a clutch member feathered upon the shaft for operatively connecting the driving sleeve directly to the drive shaft or through the reducing gears for varying the speed at which the machine is operated and moved along the edge of the table, said clutch consisting of a collar having a clutch portion arranged to engage the driving sleeve, and a second clutch portion arranged to engage one of the gears, said second member being slidably compressible into the collar whereby said second portion may be moved into engagement with the adjacent gear before the first portion is moved out of engagement with the sleeve; and means actuated by the pivotal movement of a castor in rounding a corner of the table for shifting the clutch to vary the driving speed while the machine is moving around the corners of the table.

41. In a mattress stitching machine adapted to be moved intermittently along the edge of a mattress, the combination of a pair of slidably and pivotally mounted packing needles arranged to enter the mattress at the sides of one corner thereof and to pack the mattress stuffing, during pivotal movement, into said one corner to form a roll; and a pair of former blocks slidably mounted at one side of the needles and movable into engagement with the depressed portions of the formed roll to hold said roll during the stitching thereof and to strip the formed roll from the packing needles when said needles are withdrawn from the mattress.

42. In a machine of the character described, the combination of mechanism for forming a roll at one corner of a mattress, mechanism for stitching the formed roll, a pair of slidably mounted blocks adjacent the forming mechanism and means for moving said blocks into engagement with the depressed portions of the roll in timed relation to the operation of the forming and stitching mechanisms to hold said roll during the stitching thereof and to strip said roll from the forming mechanism.

In witness whereof I hereunto set my signature.

JOSEPH WILLIAM DROLL.